US011497205B1

(12) United States Patent
Adams

(10) Patent No.: US 11,497,205 B1
(45) Date of Patent: Nov. 15, 2022

(54) RETROFIT PROPULSION APPARATUS FOR AN AVIAN DECOY

(71) Applicant: Alan D Adams, Wimberley, TX (US)

(72) Inventor: Alan D Adams, Wimberley, TX (US)

( * ) Notice: Subject to any disclaimer, the term of this patent is extended or adjusted under 35 U.S.C. 154(b) by 0 days.

(21) Appl. No.: 17/476,446

(22) Filed: Sep. 15, 2021

(51) Int. Cl.
*A01M 31/06* (2006.01)
*B63H 11/04* (2006.01)

(52) U.S. Cl.
CPC ............ *A01M 31/06* (2013.01); *B63H 11/04* (2013.01)

(58) Field of Classification Search
CPC ..... A01M 31/06; A63H 23/00; A63H 23/005; A63H 23/02; A63H 23/04; A63H 23/06; A63H 23/10; A63H 23/12; A63H 23/14; A63H 23/16; B63G 8/00; B63G 8/08; B63B 7/087; B63B 22/18; B63H 25/12; B63H 25/22
USPC .................. 43/3, 2; 446/153, 154, 156, 158, 446/160–163, 165; 114/312, 322, 283, 114/343, 144 R, 150, 151; 441/21
See application file for complete search history.

(56) References Cited

U.S. PATENT DOCUMENTS

| 2,043,827 | A | * | 6/1936 | Breuer | A01M 31/06 43/3 |
| 3,000,128 | A | * | 9/1961 | McAda | A01M 31/06 43/3 |
| 3,074,195 | A | * | 1/1963 | Vanderpool | A01M 31/06 43/3 |
| 5,293,712 | A | * | 3/1994 | Lo | A01K 91/02 43/26.1 |
| 5,832,650 | A | * | 11/1998 | Franceschini | A01M 31/06 43/3 |
| 6,601,333 | B2 | * | 8/2003 | Cicoff | A01M 31/06 43/2 |
| 7,472,508 | B2 | * | 1/2009 | Myers, IV | A01M 31/06 43/26.1 |
| 7,884,730 | B2 | * | 2/2011 | Alvarado | A01M 31/002 340/573.2 |
| 8,266,836 | B2 | * | 9/2012 | Ware | A01M 31/06 43/3 |
| 8,713,846 | B1 | * | 5/2014 | Thrash | A63H 11/10 43/2 |
| 8,833,288 | B2 | * | 9/2014 | Bertelsen | B63B 27/36 114/326 |

(Continued)

FOREIGN PATENT DOCUMENTS

| CA | 2862062 A1 * | 3/2015 | ............ A01M 31/06 |
| DE | 9404049 U1 * | 9/1994 | ............ A63H 23/10 |

*Primary Examiner* — Darren W Ark
(74) *Attorney, Agent, or Firm* — Mark P Kahler

(57) ABSTRACT

A retrofit propulsion apparatus attaches to an avian decoy to provide both propulsion and steering to the decoy under remote control by the user. The retrofit propulsion apparatus attaches to decoys with different keel geometries without the need to modify the retrofit propulsion apparatus for each decoy keel geometry. The apparatus includes a housing that contains electrical circuitry with control circuitry that couples to inboard water propulsion devices to provide thrust and steering to the decoy. A housing cover sealably attaches to the housing to seal the housing. The housing cover includes a slot that receives a vertical member of a decoy keel. The housing includes an angled channel that receives both a decoy with a decoy bottom member with vertical spaced apart sides and a decoy with a decoy bottom member with angled sides.

14 Claims, 39 Drawing Sheets

(56) References Cited

U.S. PATENT DOCUMENTS

| | | | |
|---|---|---|---|
| 10,412,955 B2* | 9/2019 | Scherr | A01M 31/06 |
| 10,517,290 B2* | 12/2019 | Young | A01M 31/06 |
| 10,729,125 B2* | 8/2020 | Beauchamp | A01M 31/06 |
| 2005/0042970 A1* | 2/2005 | Schwartz | A63H 23/005 |
| | | | 446/154 |
| 2006/0010763 A1* | 1/2006 | Podlewski | A01K 85/16 |
| | | | 43/17.6 |
| 2006/0016115 A1* | 1/2006 | Ware | A01M 31/06 |
| | | | 43/3 |
| 2009/0188148 A1* | 7/2009 | Orris | A01M 31/06 |
| | | | 43/3 |
| 2011/0067289 A1* | 3/2011 | Lane | A01M 31/06 |
| | | | 43/3 |
| 2014/0115944 A1* | 5/2014 | Thomas | A01K 85/01 |
| | | | 43/4.5 |
| 2014/0259863 A1* | 9/2014 | Martinez | A01K 91/02 |
| | | | 43/4.5 |
| 2015/0156998 A1* | 6/2015 | Terry | A01K 69/00 |
| | | | 43/4.5 |
| 2015/0313198 A1* | 11/2015 | Castaneda | G01G 19/415 |
| | | | 43/17 |
| 2015/0342169 A1* | 12/2015 | Zeevi | G03B 17/08 |
| | | | 43/4.5 |
| 2016/0309704 A1* | 10/2016 | Young | A01M 31/06 |
| 2017/0049095 A1* | 2/2017 | Hanson | A01M 31/06 |
| 2019/0116782 A1* | 4/2019 | Hanson | A01M 31/06 |
| 2020/0146279 A1* | 5/2020 | Young | A01M 31/06 |
| 2020/0375175 A1* | 12/2020 | Herrington | G08C 17/02 |
| 2021/0141379 A1* | 5/2021 | DeLoach, III | H04W 4/029 |
| 2021/0244014 A1* | 8/2021 | Furness | A01M 31/06 |

* cited by examiner

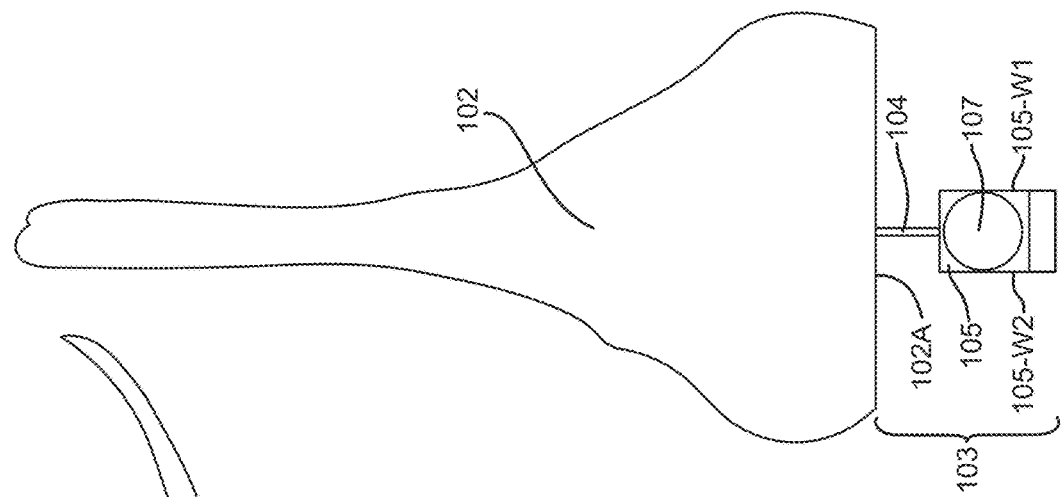
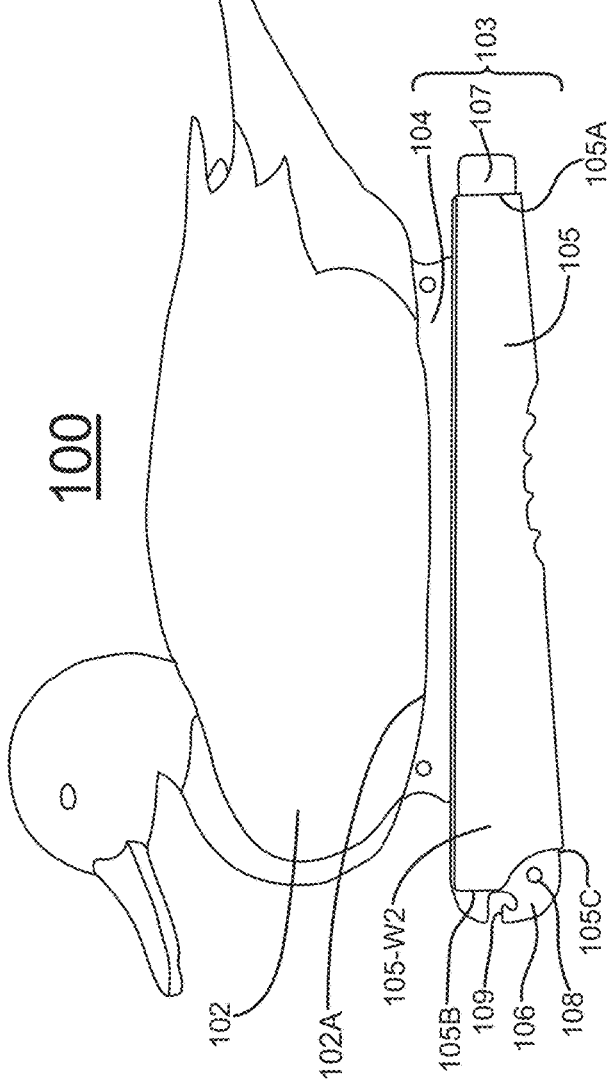

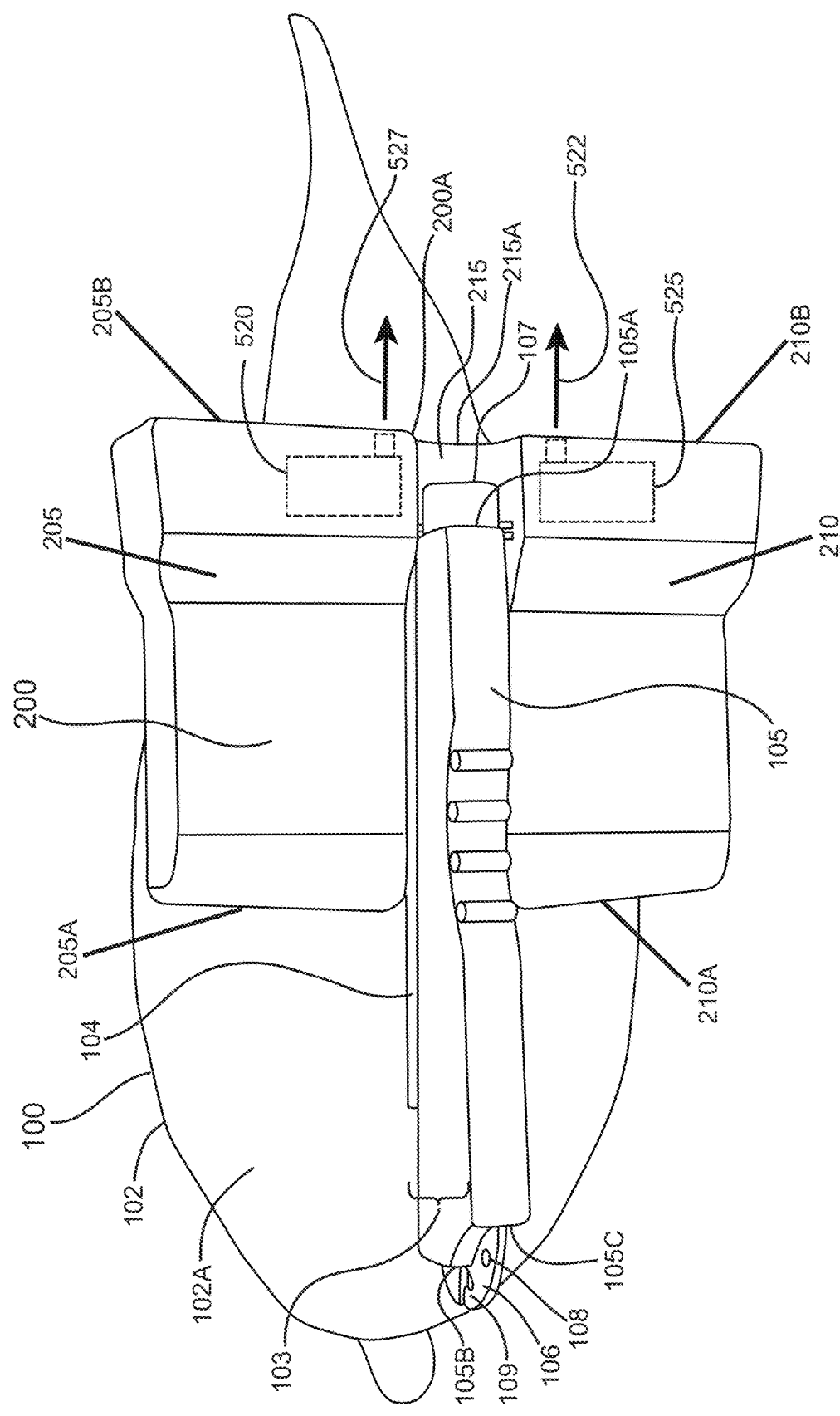

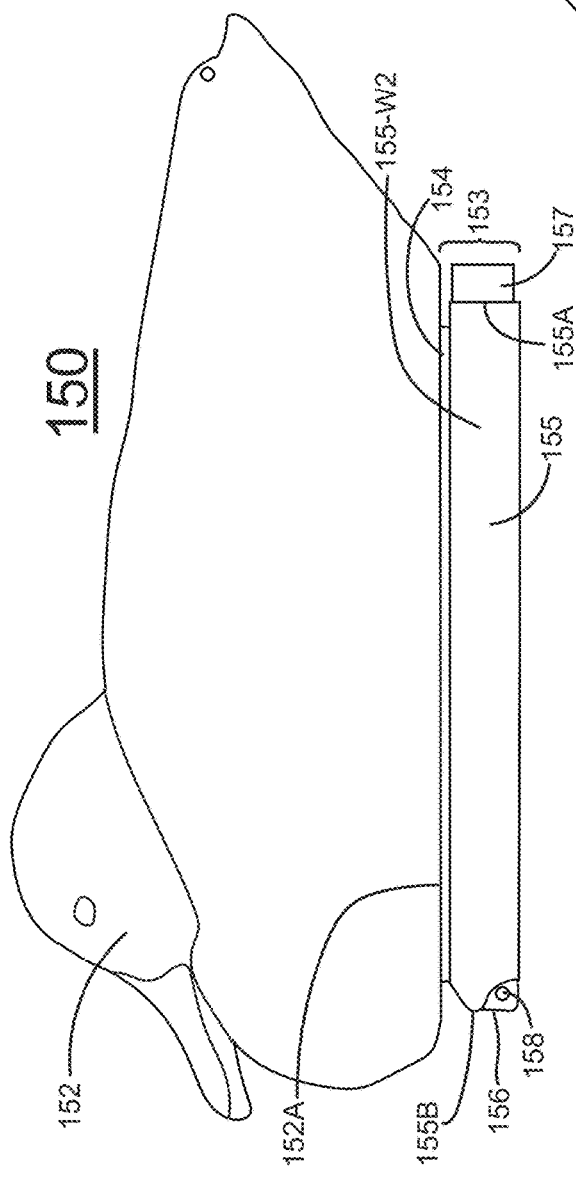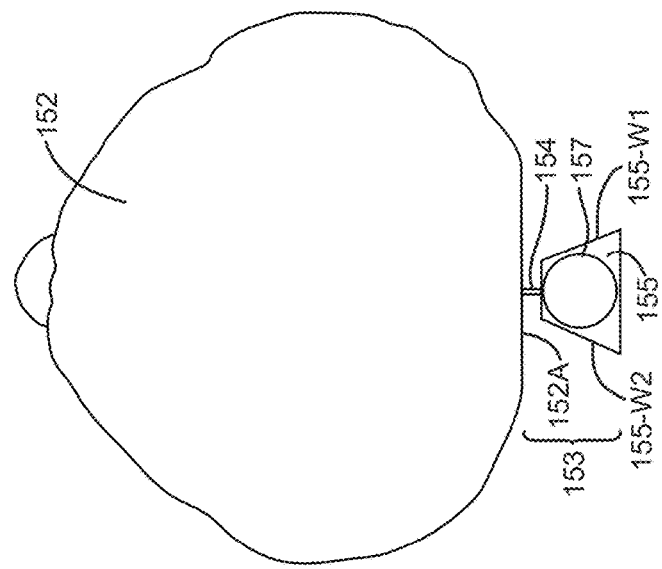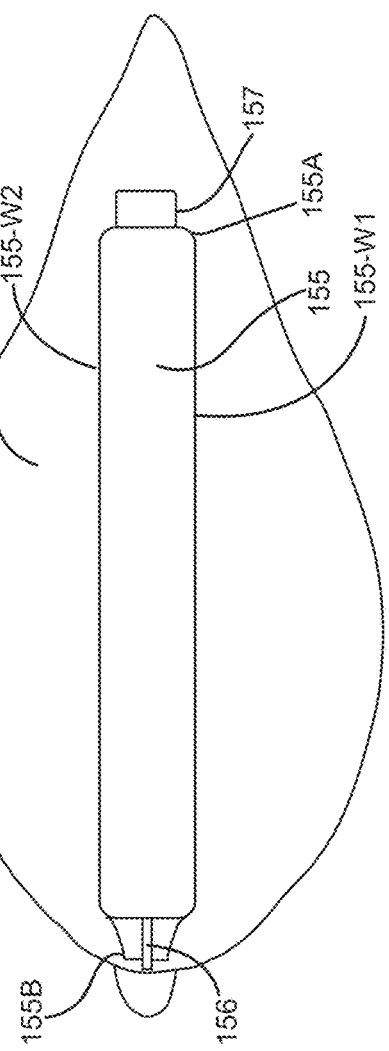

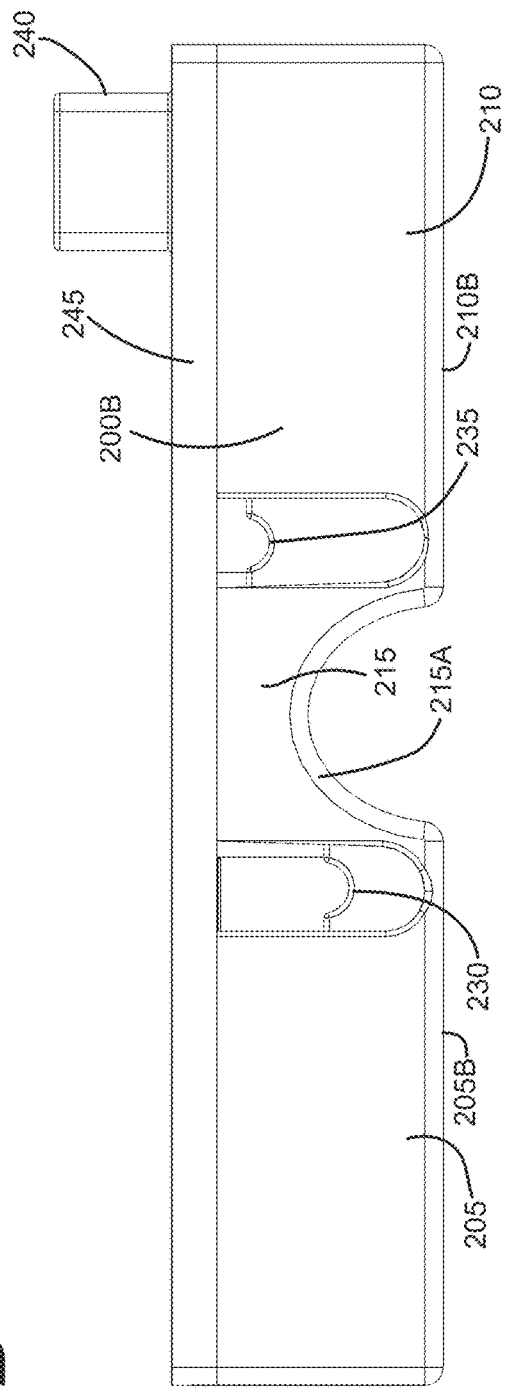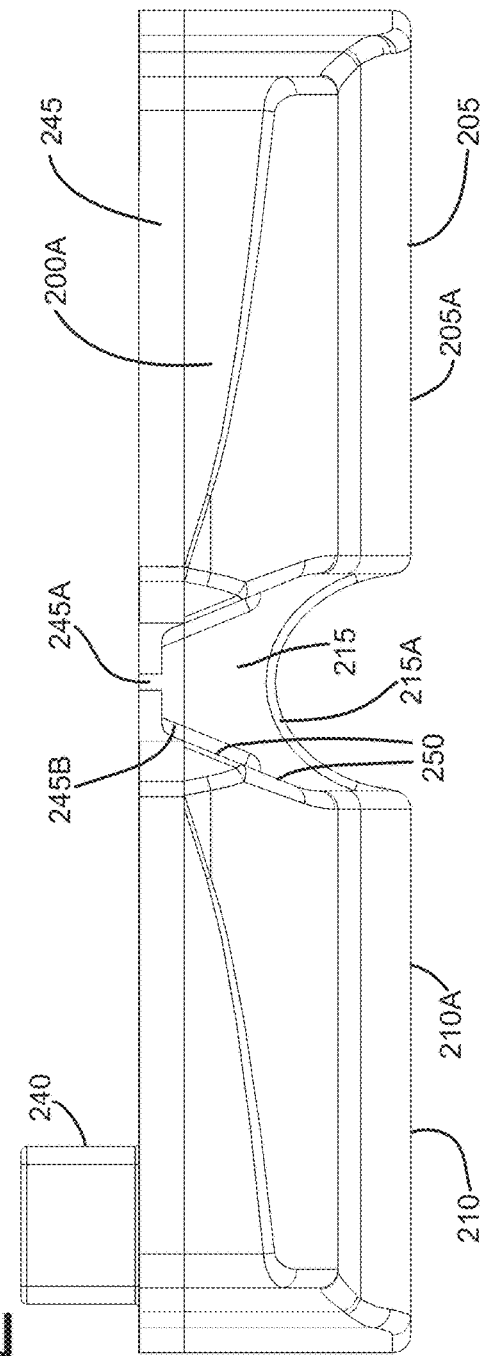

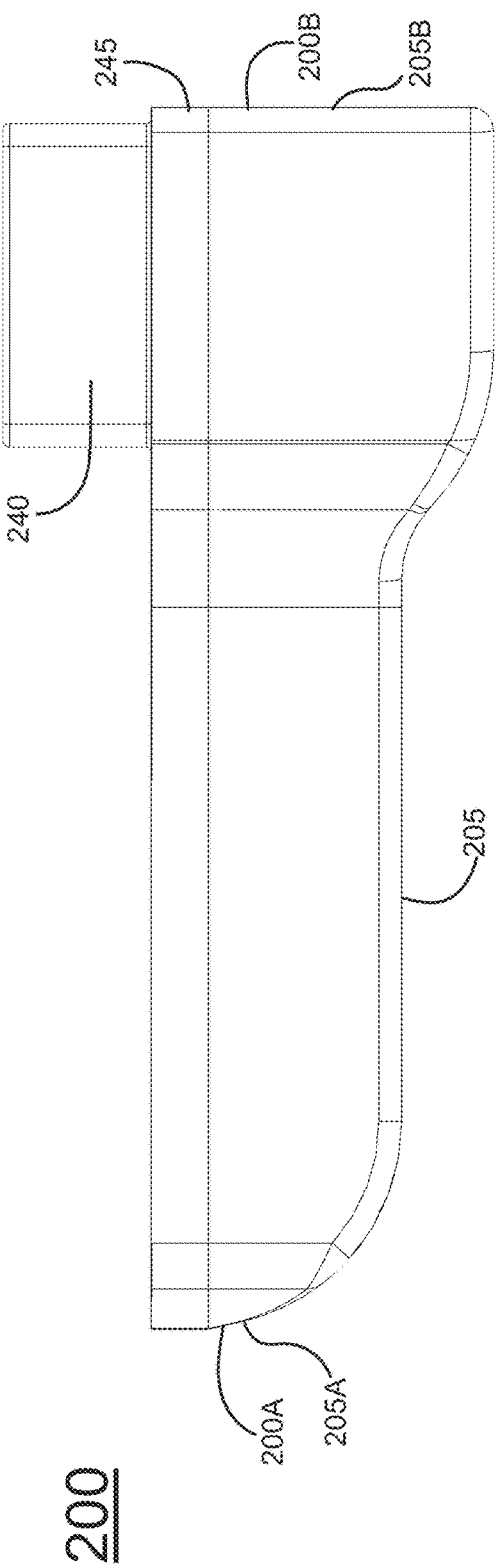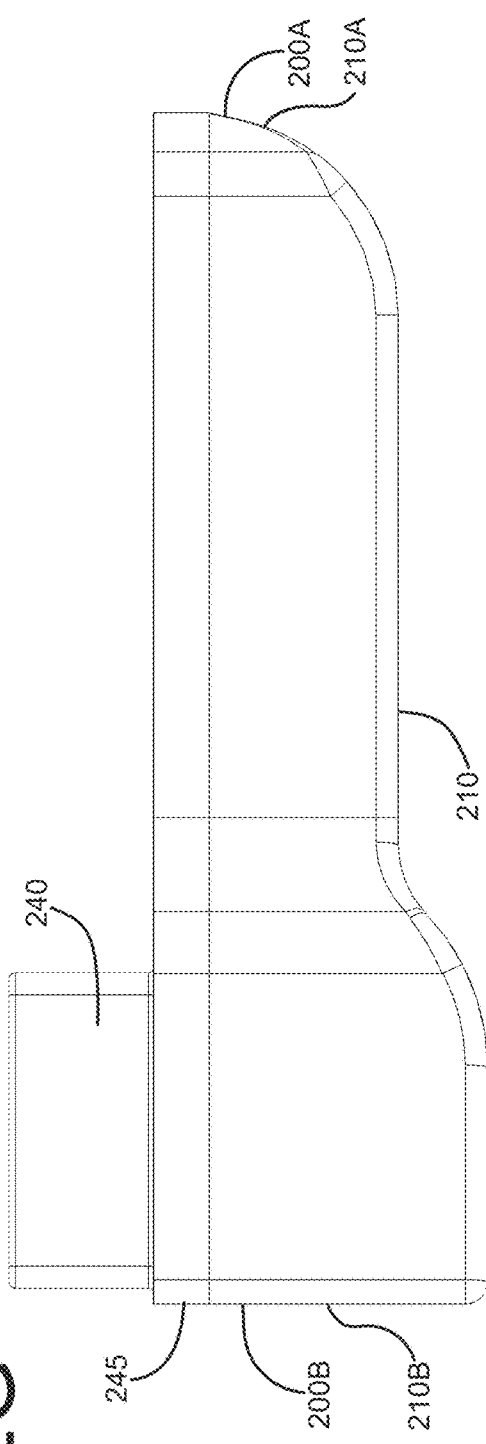

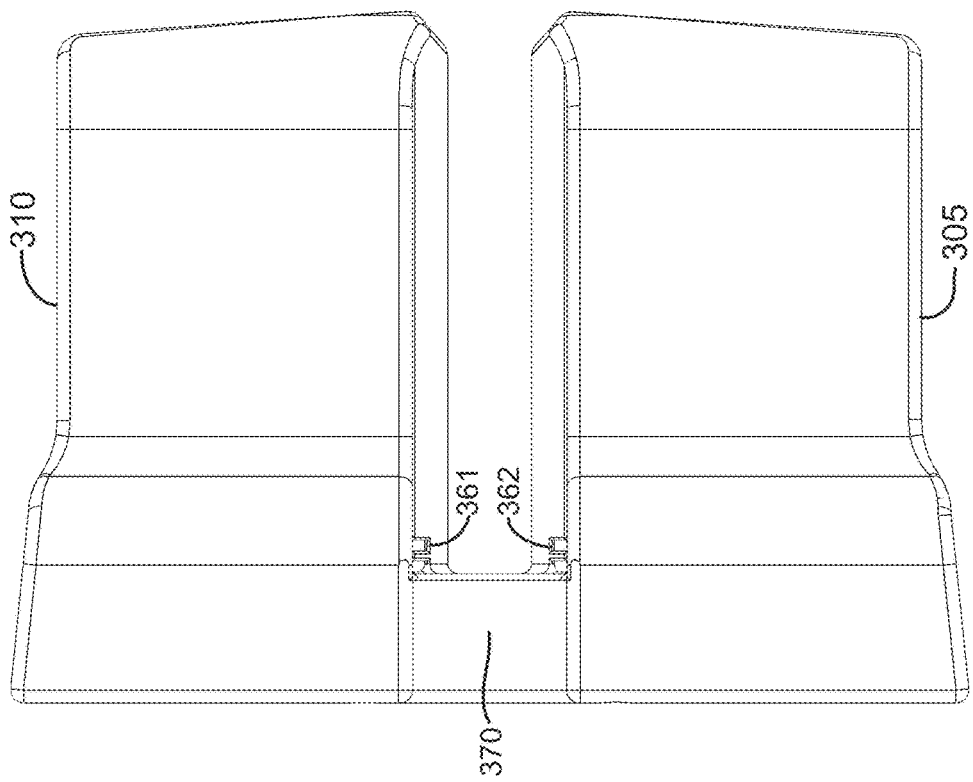
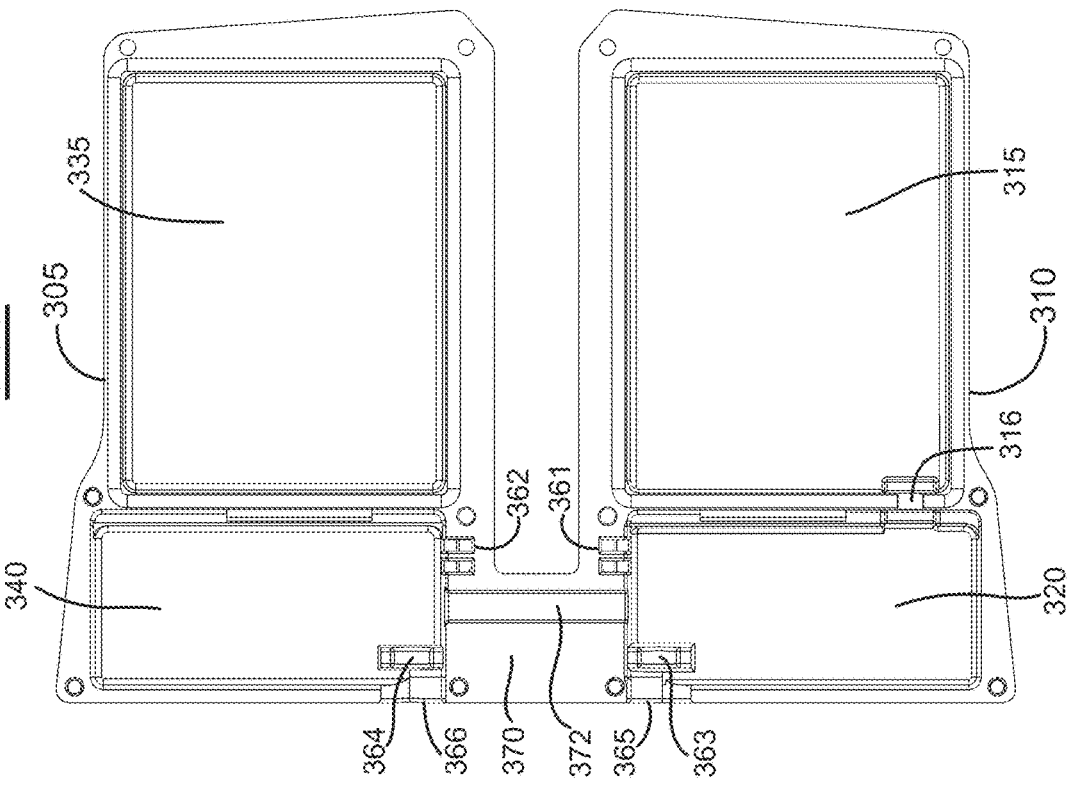

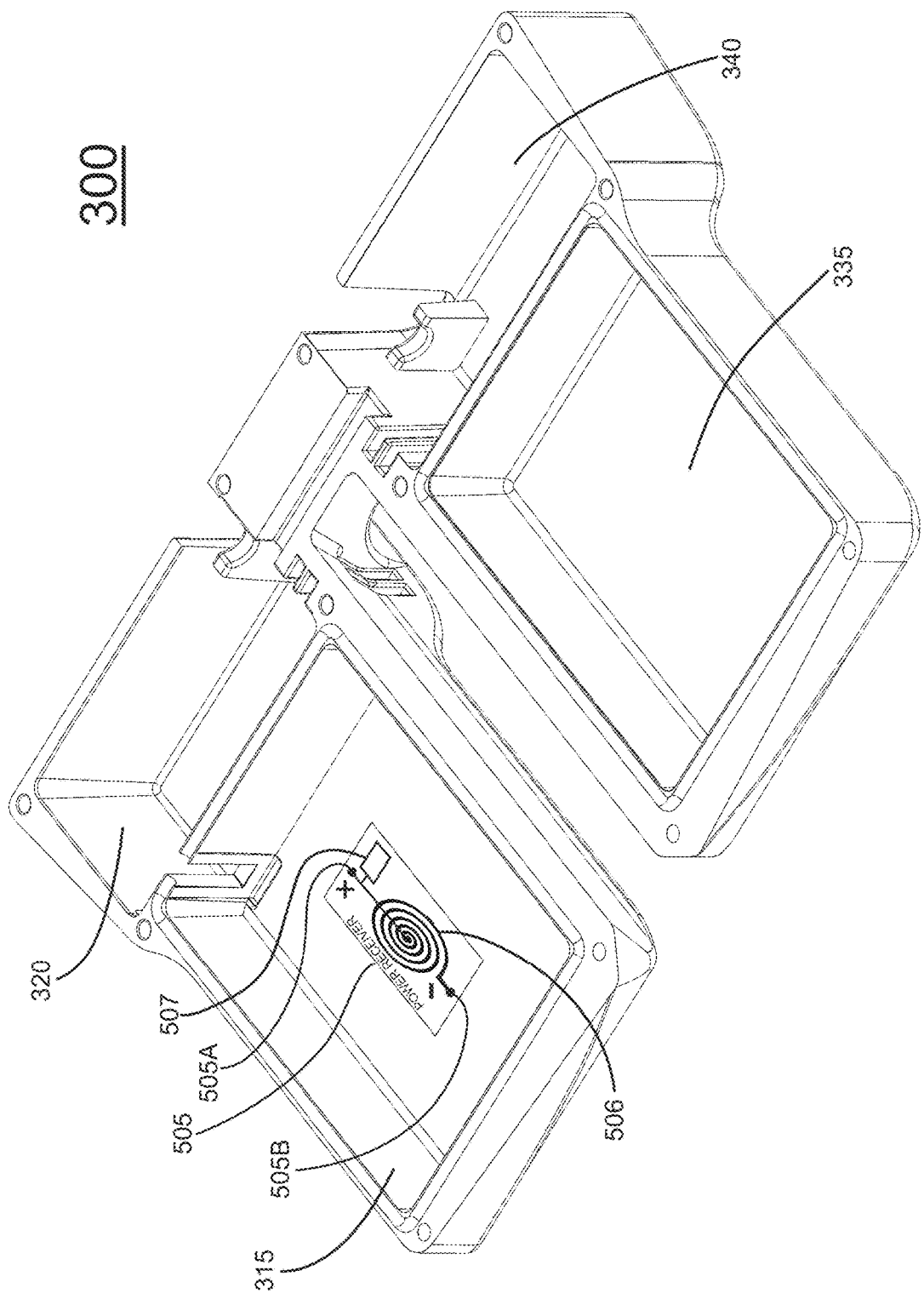

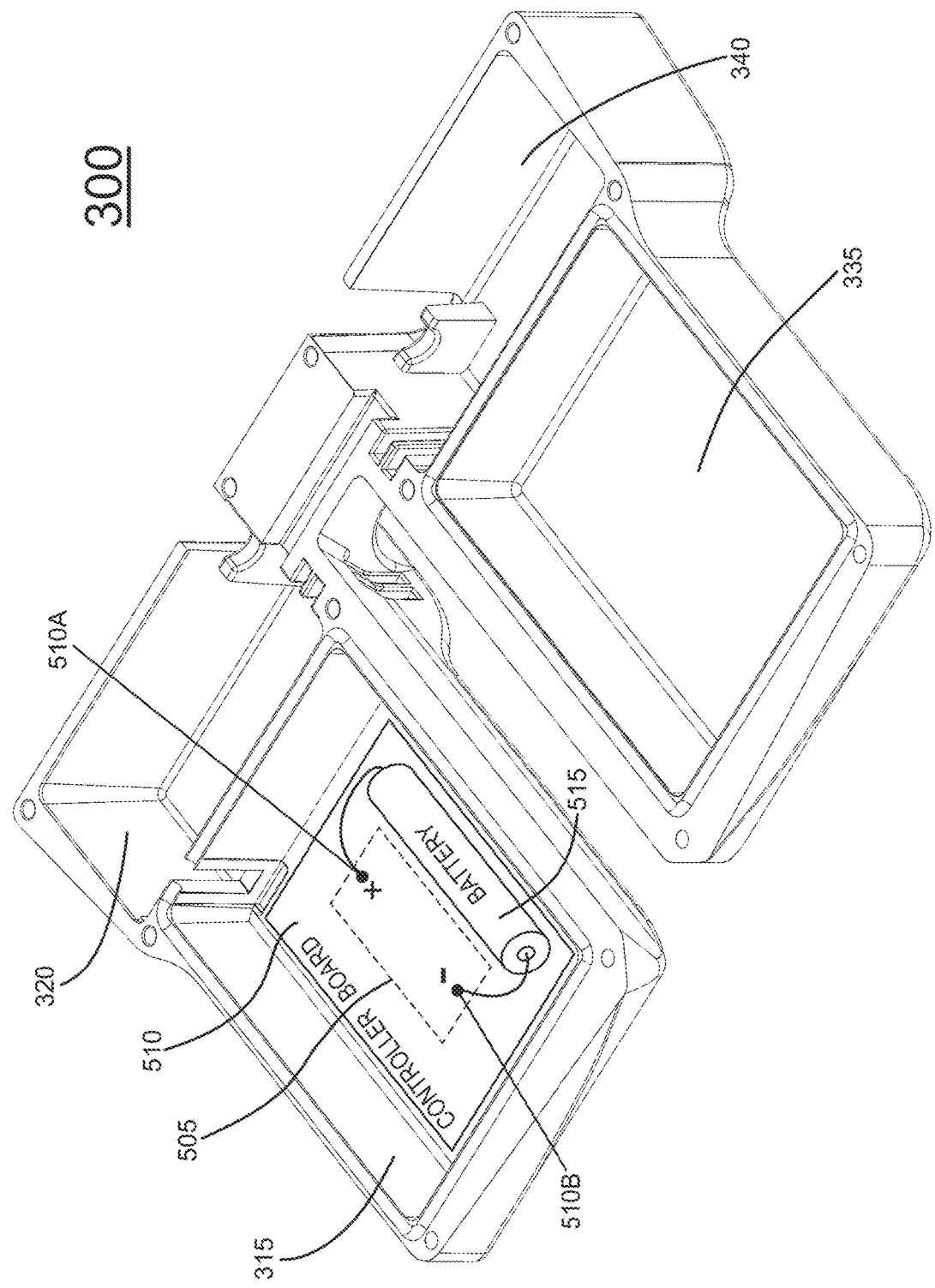

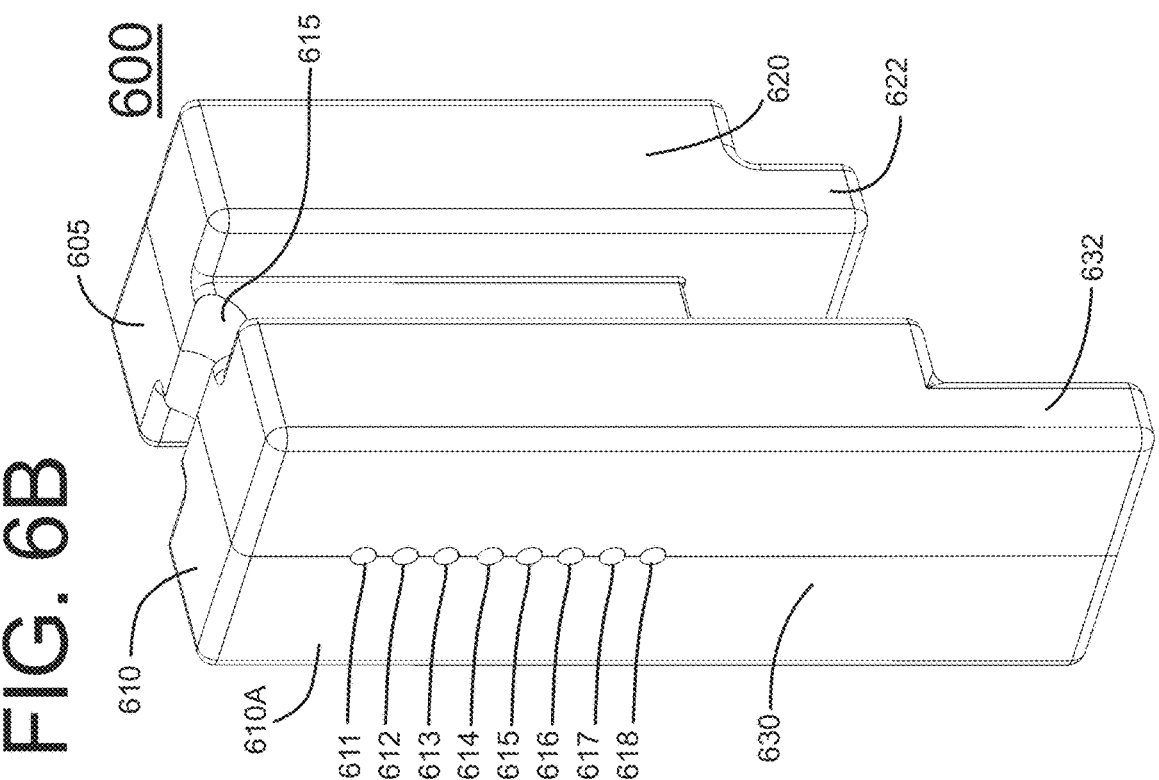
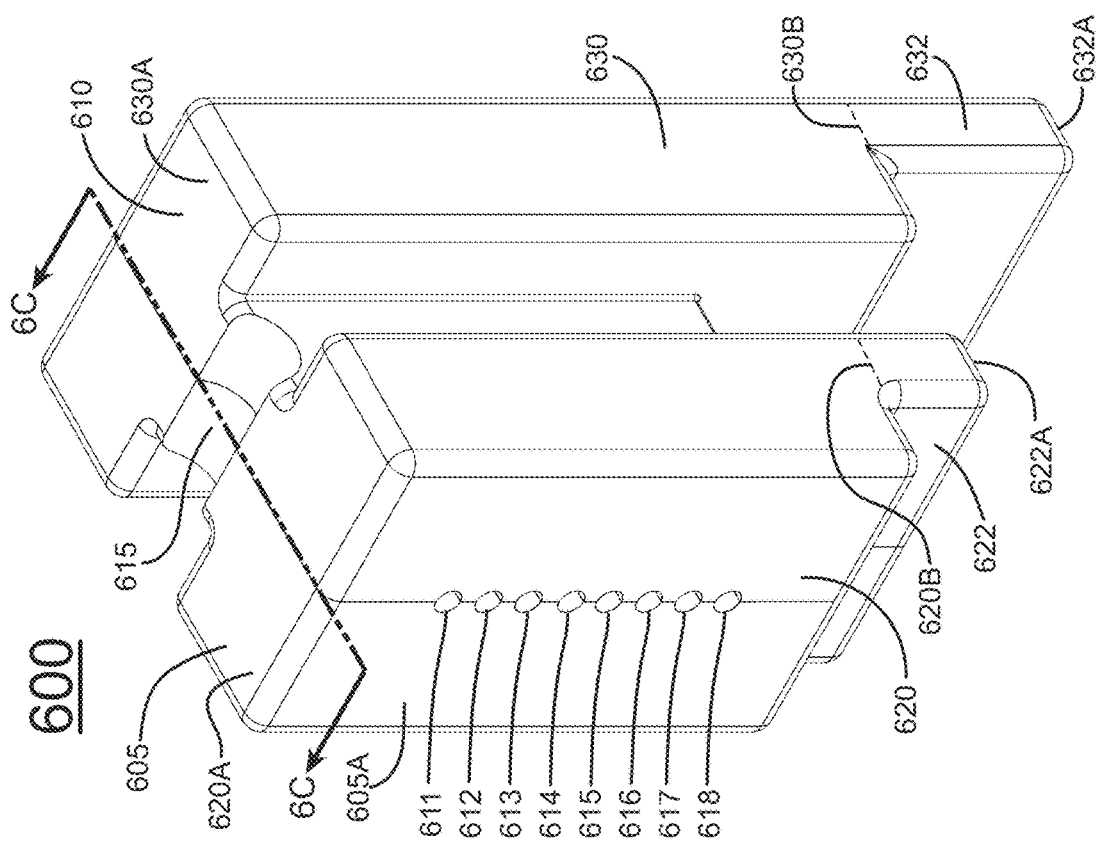

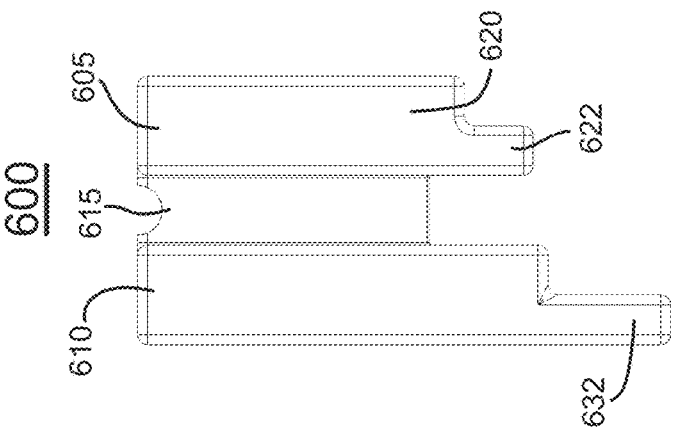
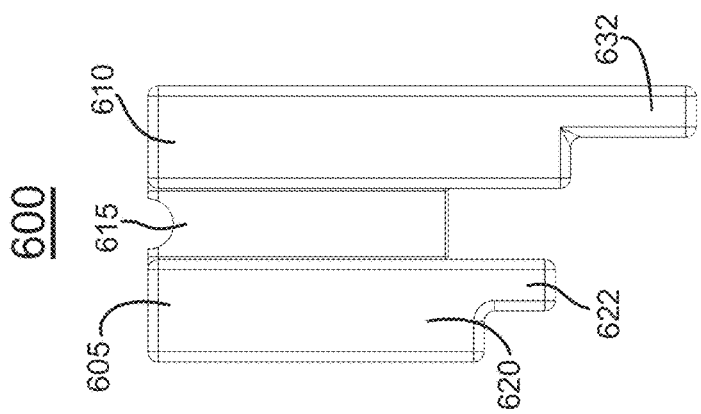
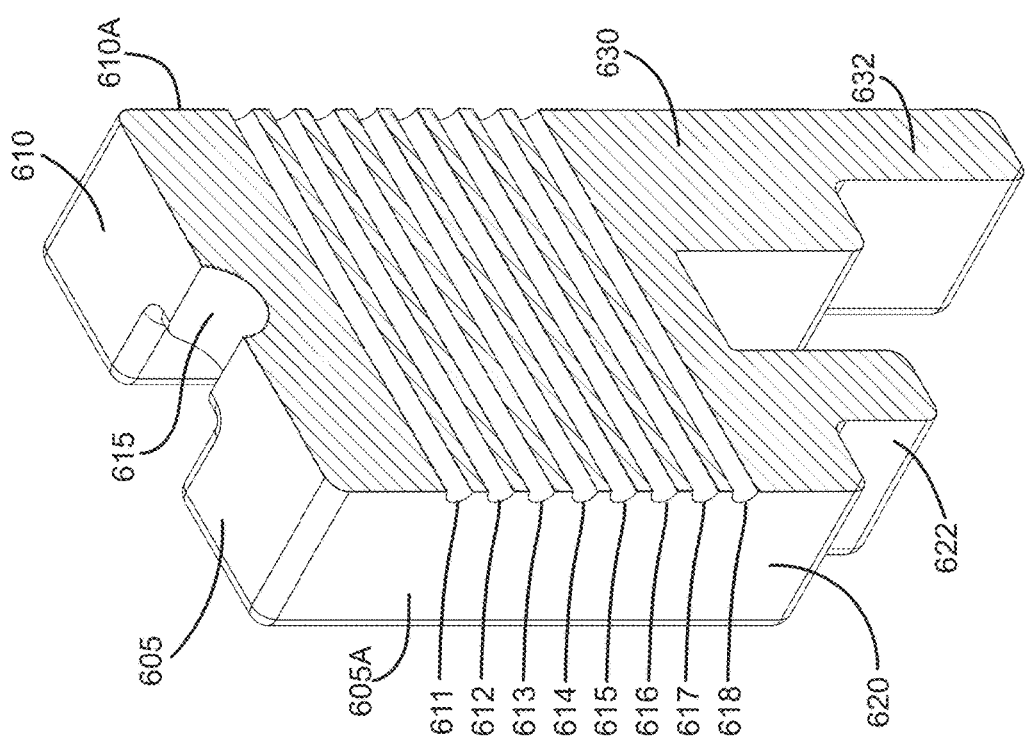

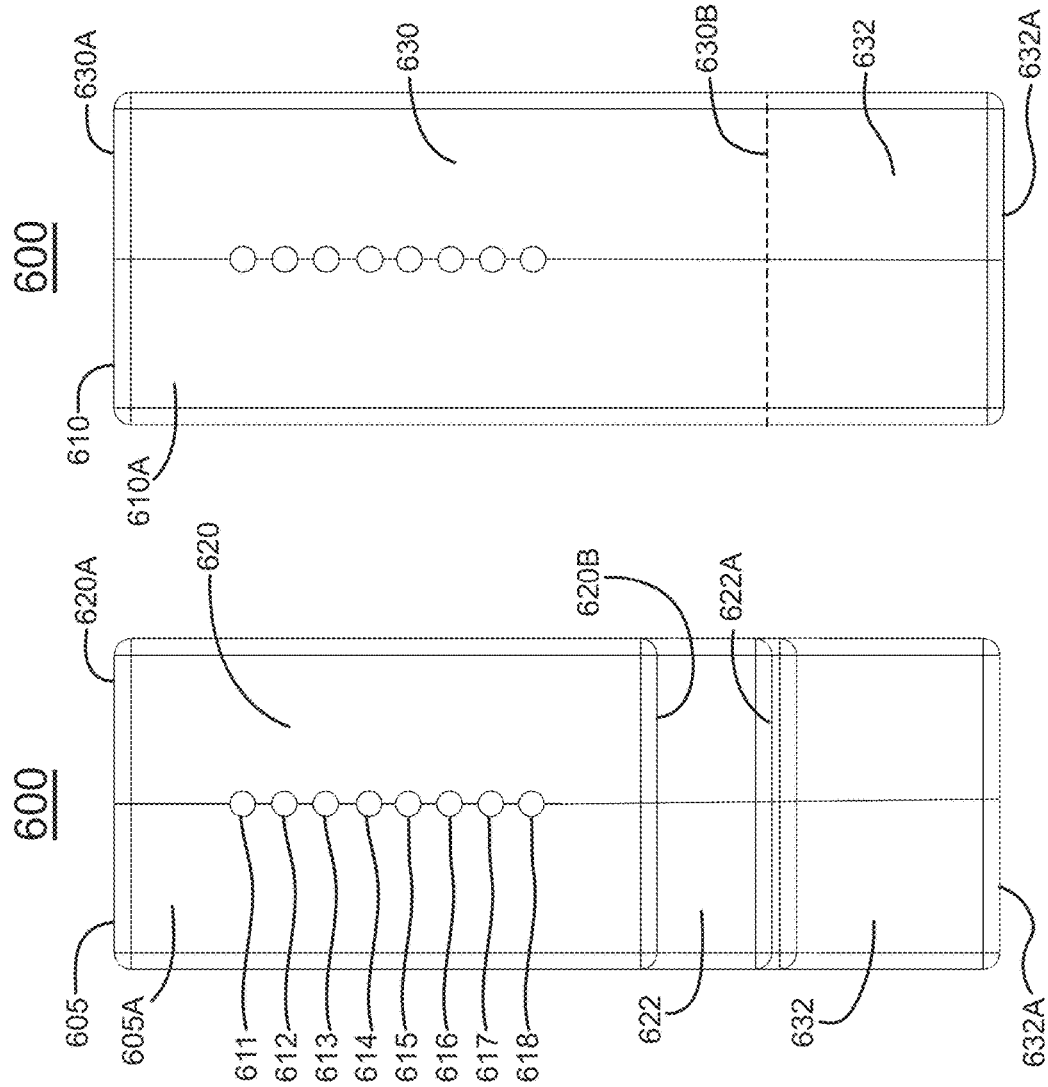
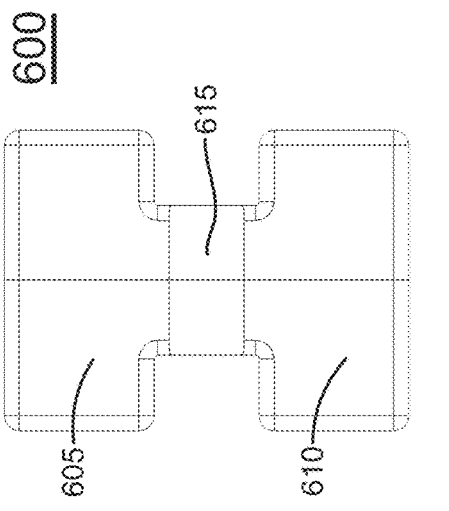
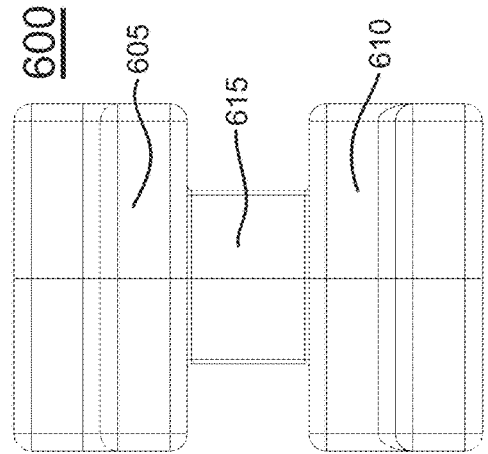

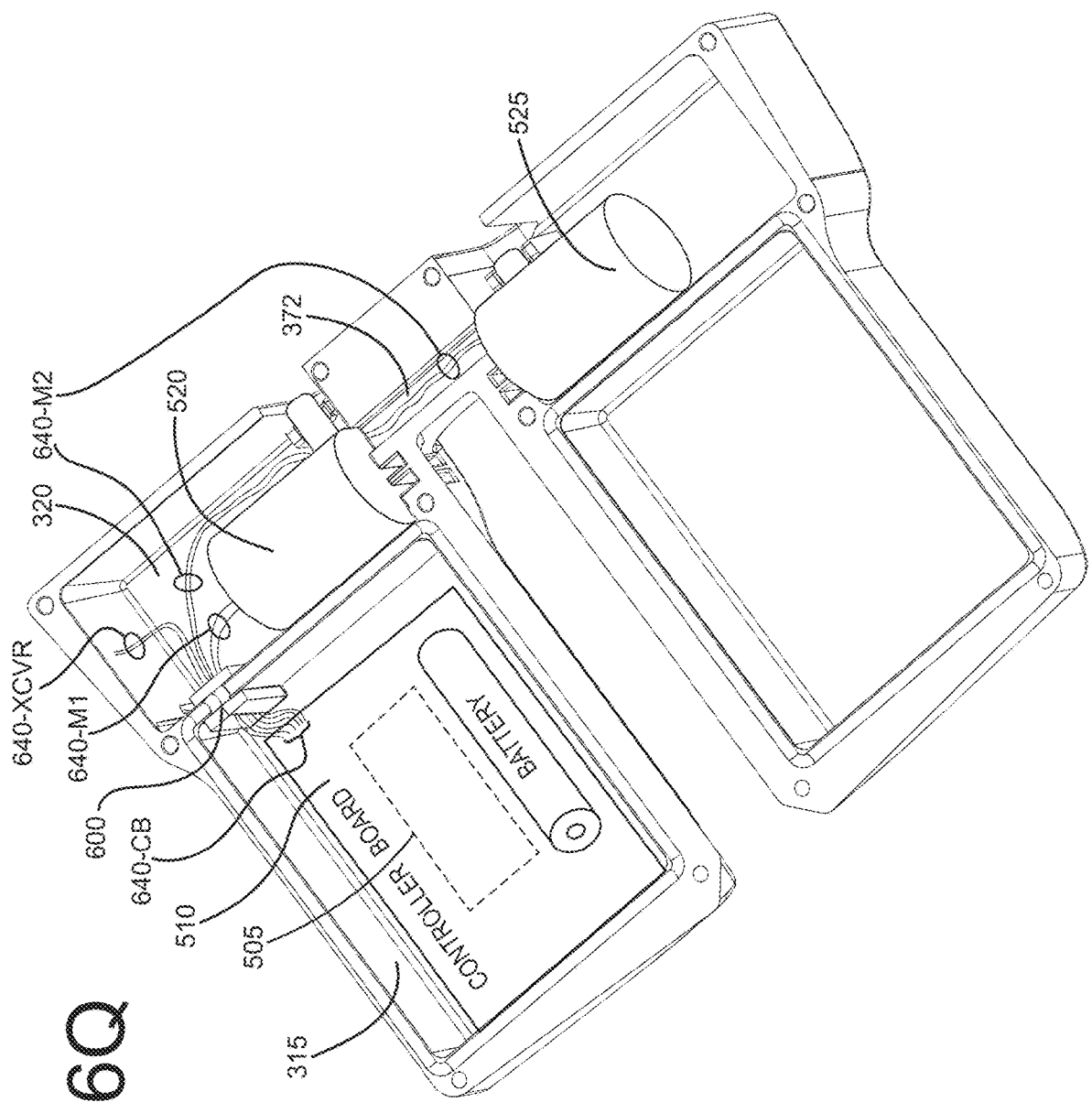

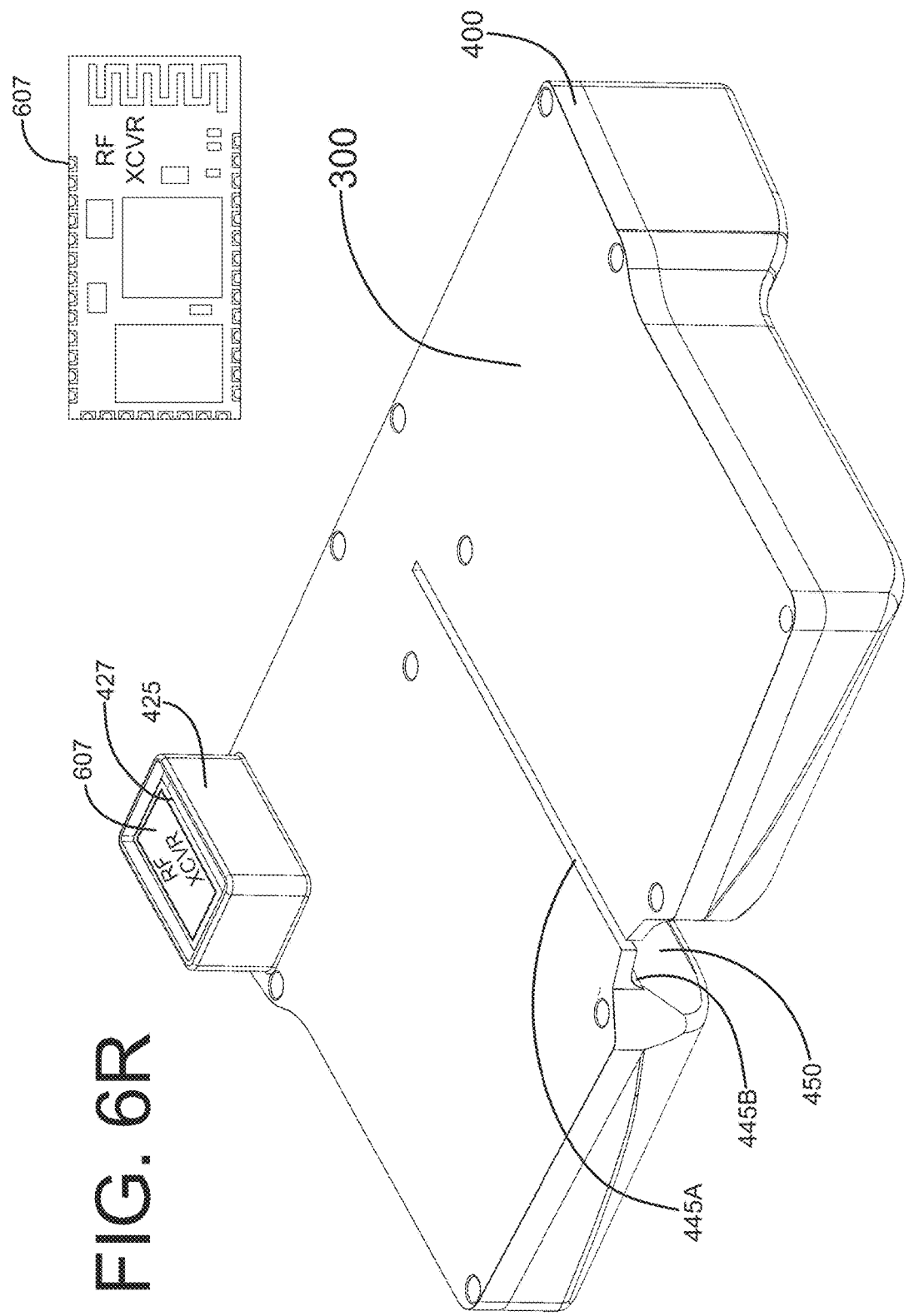

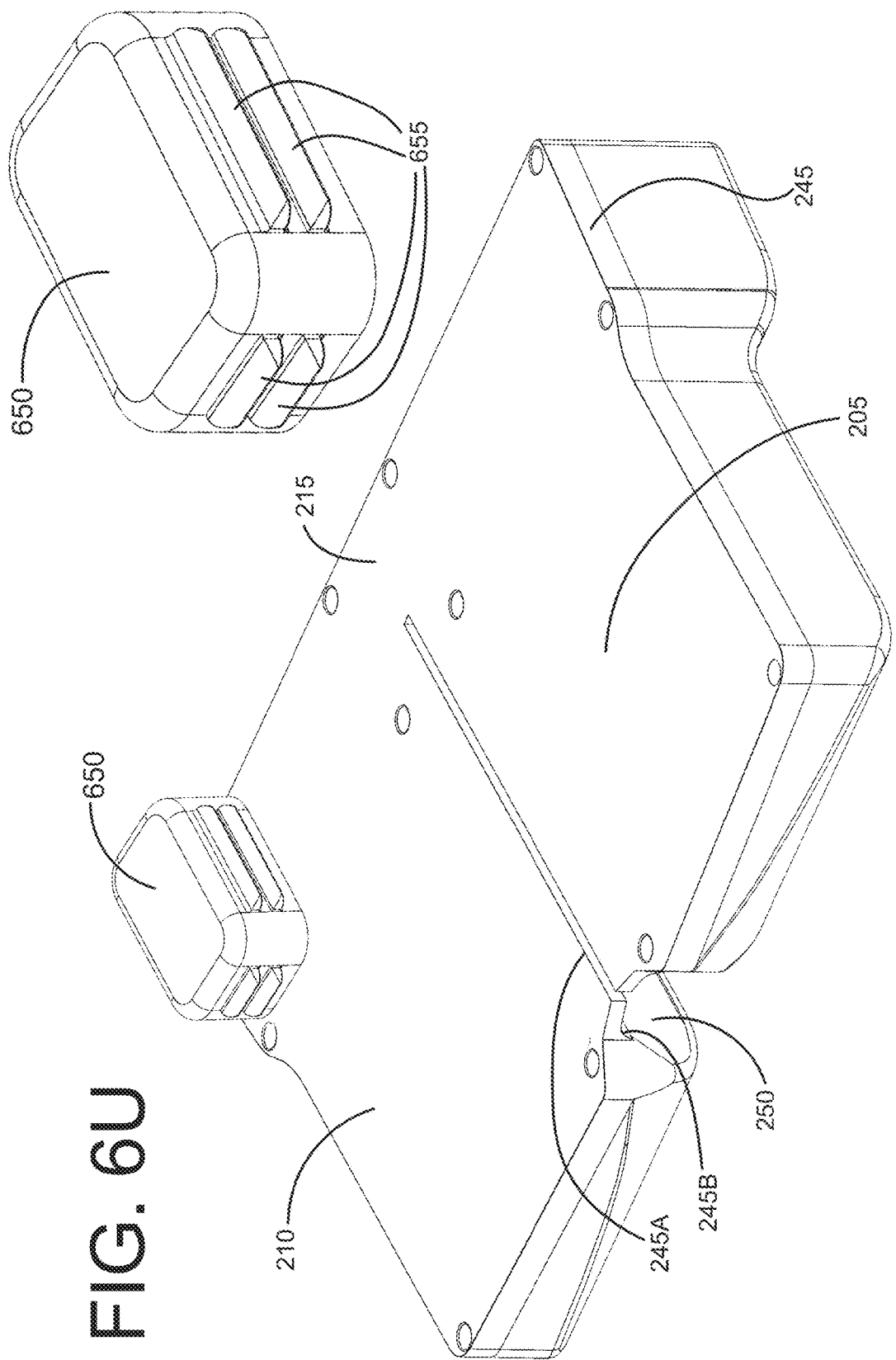

RETROFIT PROPULSION APPARATUS FOR AN AVIAN DECOY

BACKGROUND

The disclosures herein relate generally to avian decoys, and more particularly, to providing a retrofittable propulsion system for avian decoys for use in an aquatic environment.

BRIEF DESCRIPTION

In one embodiment, a retrofit propulsion apparatus is disclosed that is attachable to an avian decoy to propel the avian decoy in an aquatic environment. The apparatus includes a first housing with a first watertight chamber, the first housing further including a first non-watertight chamber. The first watertight chamber and the first non-watertight chamber share a first common wall therebetween. The apparatus also includes a second housing with a second watertight chamber, the second housing further including a second non-watertight chamber, wherein the second watertight chamber and the second non-watertight chamber share a second common wall therebetween. The apparatus further includes a connective member that connects the first housing to the second housing at a common rear end of the first and second housings, the connective member holding the first housing spaced-apart from the second housing to form a slot therebetween. The slot is configured to be sufficiently wide to receive a portion of a keel of the avian decoy to mount the retrofit propulsion apparatus to the avian decoy. A first water propulsion device is situated in the first non-watertight chamber of the first housing, and a second water propulsion device is situated in the second non-watertight chamber of the second housing to provide thrust and steering to the decoy in the aquatic environment.

BRIEF DESCRIPTION OF THE DRAWINGS

The appended drawings illustrate only exemplary embodiments of the invention and therefore to not limit its scope because the inventive concepts lend themselves to other equally effective embodiments.

FIG. 1A is a side plan view of a representative decoy with keel to which one embodiment of the disclosed propulsion system may be attached.

FIG. 1B is a bottom plan view of the decoy of FIG. 1A.

FIG. 1C is a rear plan view of the decoy of FIG. 1A.

FIG. 1E is a bottom perspective view the disclosed retrofittable propulsion apparatus shown mounted on the keel of the decoy of FIG. 1A.

FIG. 1I is a front plan view of the disclosed retrofittable propulsion apparatus shown mounted on the keel of the decoy of FIGS. 1A-1C.

FIG. 1J is a side plan view of an alternative representative decoy including an alternative geometry keel to which one embodiment of the disclosed propulsion system may be attached.

FIG. 1K is a bottom plan view of the decoy of FIG. 1J.

FIG. 1L is a rear plan view of the decoy of FIG. 1A showing the keel.

FIG. 2D is a rear plan view of the RPA embodiment of FIG. 2A.

FIG. 2E is front plan view of the RPA embodiment of FIG. 2A.

FIG. 2F is a right plan view of the RPA embodiment of FIG. 2A.

FIG. 2G is left plan view of the RPA embodiment of FIG. 2A.

FIG. 3A-2 is a rear perspective view of the drive assembly of FIG. 3A-1.

FIG. 3B is a top plan view of the drive assembly of FIG. 3A-1.

FIG. 3C is a bottom plan view of the drive assembly of FIG. 3A-1.

FIG. 5A is a perspective view of the drive assembly with a wireless power receiver installed therein.

FIG. 5B shows the view of FIG. 5A with a controller board and battery installed.

FIG. 6A is a front perspective view of a grommet that maintains the watertight seal of a chamber of RPA 200.

FIG. 6B is a rear perspective view of a grommet of FIG. 6A.

FIG. 6C is a cross section of the grommet of FIG. 6A taken along section line 6C-6C.

FIG. 6D is a right side plan view of the grommet of FIG. 6A.

FIG. 6E is a left side plan view of the grommet of FIG. 6A.

FIG. 6F is a front plan view of the grommet of FIG. 6A.

FIG. 6G is a rear plan view of the grommet of FIG. 6A.

FIG. 6H is a top plan view of the grommet of FIG. 6A.

FIG. 6I is a bottom plan view of the grommet of FIG. 6A.

FIG. 6Q is a perspective view of the drive assembly after installation of representative wiring.

FIG. 6R is a perspective view of the drive assembly showing a transceiver tower on the cover of the drive assembly.

FIG. 6S is a top view of a representative RF transceiver (RF XCVR) suitable for installation in the transceiver tower of the drive assembly.

FIG. 6T is a perspective view of a cover that seals the RF XCVR in the tower of the cover of the drive assembly.

FIG. 6U is a perspective view of the drive assembly after installation of the cover on the tower on the cover of the drive assembly.

DETAILED DESCRIPTION

Figure 1D:
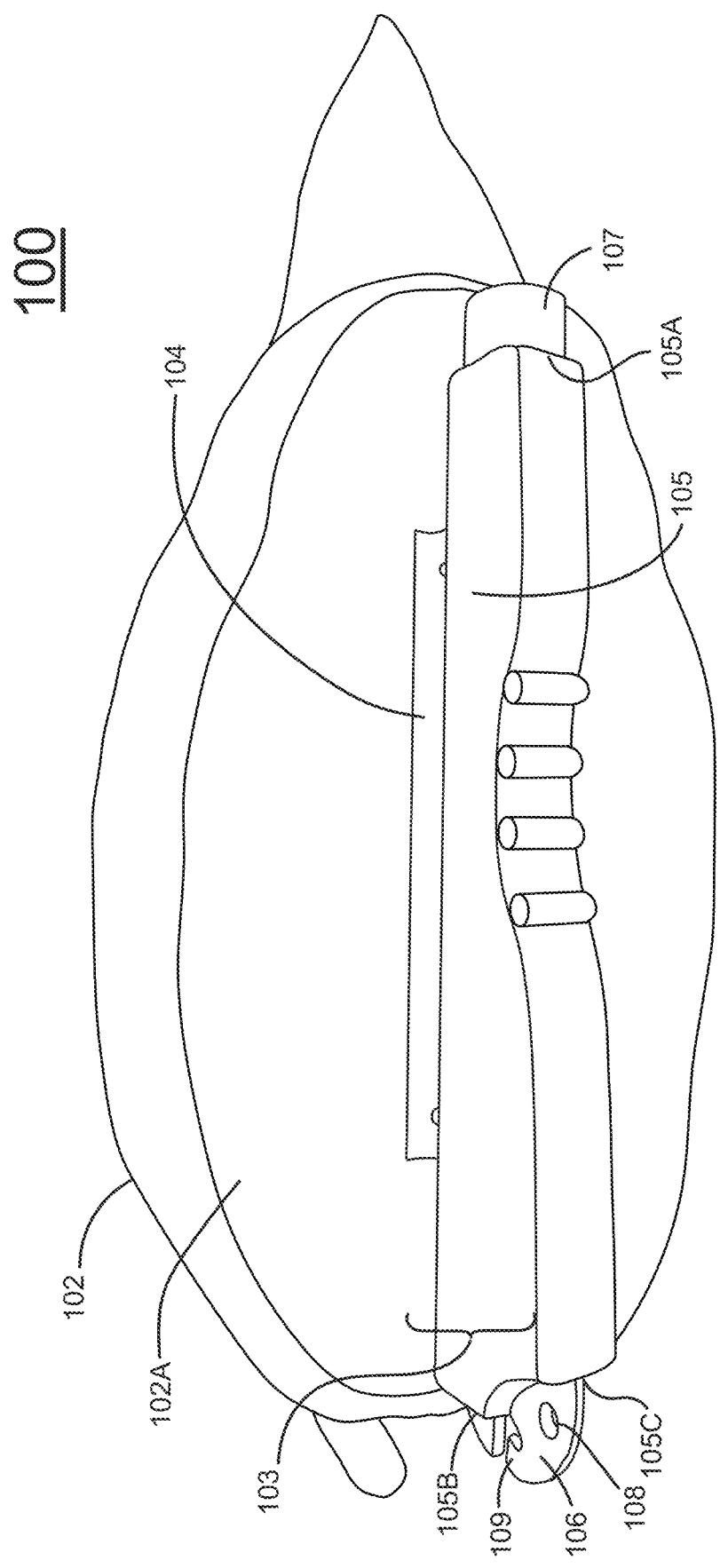
FIG. 1D is a bottom perspective view of the decoy of FIG. 1A.

Decoys are often used in an aquatic environment to attract avians (e.g. birds, geese and other waterfowl) for hunting purposes. While lifelike decoys have been created that closely resemble the appearance of real avians, it is also desirable that decoys move in the aquatic environment in a manner similar to real avians. In this manner, decoys more effectively attract avians for hunters. While a given decoy can be redesigned and equipped with an integral in-board propulsion system, this approach tends to be expensive. For this reason, it is desirable that a retrofittable propulsion apparatus be created for mounting to an existing avian decoy without substantially modifying the configuration of the avian decoy. The disclosures herein address this need.

REPRESENTATIVE COMPONENT LIST

The following component list is provided as a convenience to the reader. The disclosed technology is not limited to only these representative components that are recited below for purposes of example and convenience for the reader.

100 decoy
102 body
102A bottom surface
103 keel
104 keel vertical member
105 keel bottom member
105A keel end
105B keel end
105C keel end
108 hole
109 hook portion
150 alternative decoy
153 keel
154 keel vertical member
155 keel bottom member
155-W1 angled side wall of keel
155-W2 angled side wall of keel
155A keel end
155B keel end
156 connective extension
157 cap
158 hole
200 retrofit propulsion apparatus (RPA)
205 housing
205A housing front end
205B housing rear end
210 housing
210A housing front end
210B housing rear end
215 connective member
215A channel
245A slot
245B channel
250 housing channel
250-W1 angled side wall of housing channel 250
250-W2 angled side wall of housing channel 250
300 drive assembly
300A front end
300B rear end
305 housing
305A housing front
305B housing rear
310 housing
310A housing front
310B housing rear
315 chamber
315A chamber wall
315B chamber wall
315C chamber wall
315D chamber wall
315E floor
315-F female sealing member
315-P wall upper periphery
316 opening
317 floor indentation
320 antechamber
320A chamber wall
320B chamber wall
320C chamber wall
320D chamber wall
320E floor
335 chamber
335A chamber wall
335B chamber wall
335C chamber wall
335D chamber wall
335E floor
335-F female sealing member
340 antechamber 340A chamber wall
340B chamber wall
340C chamber wall
340D chamber wall
340E floor
361 water intake vent
362 water intake vent
363 exhaust nozzle support
364 exhaust nozzle support
365 output port
366 output port
370 connective member
372 wiring channel
400 cover
400A cover front side
400B cover back side
400C cover left side
400D cover right side
405 cover portion
410 cover portion
405-M male sealing member
410-M male sealing member
415 connective member
425 RF transceiver housing
427 housing floor
427A opening in housing floor
445A slot
445B channel
505 power receiver
505A positive output
505B negative output
506 power receiving coil
507 rectifier
510 controller board
515 battery
525 water propulsion device
525A water output nozzle
527 arrow
600 grommet
607 RF transceiver
605 rectangular seal member
607 RF transceiver
605A forward grommet face
610 rectangular seal member
610A rearward grommet face
611, 612, . . . 628—conduits
615 connective member
615A top of connective member 615
620 main body of seal member 605
620A top of main body of seal member 605
620B bottom of main body of seal member 605
622 seal member extension
622A bottom of seal member extension
630 main body of seal member 610
630A top of main body of seal member 610
630B top of main body of seal member 610
632 seal member extension
632A bottom of seal member extension
640 electrical wires
640-CB wires from controller board
640-M1 wires to water propulsion device 520
640-M2 wires to water propulsion device 525
640-XCVR wires to RF transceiver XCVR 605
700 decoy propulsion and control system
710 microcontroller
712 memory 720 wireless remote controller (mobile transceiver, control transceiver)
725 antenna
730 power control
735 pump power output
740 pump power output
755 power transmitter (charging station)

FIG. 1A shows a side plan view of a representative avian decoy 100 including a keel to which of the disclosed retrofittable propulsion apparatus may be attached. Decoy 100 includes a decoy body 102 that it is shaped and colored to resemble a particular waterfowl variety such as a duck, goose or other waterfowl. Decoy 100 includes a relatively flat bottom surface 102A that faces downward when the decoy is deployed in water. Decoy 100 includes a keel 103 that may exhibit an I-beam like shaped geometry formed by relatively flat surface 102A at the top, vertical keel member 104 in the middle, and keel bottom member 105 at the bottom as seen in FIG. 1A, and more clearly in FIG. 1C. Keel vertical member 104 is narrower than keel bottom member 105 and bottom surface 102A, thus contributing to the I-beam like geometry of keel 103.

Decoy keel bottom member 105 includes opposed ends 105A and 105B. A connective extension 106 extends from the bottom end 105C of decoy keel bottom member 105, as shown in FIG. 1A. Connective extension 106 may include a hole 108 and/or a hook portion 109 for tying or otherwise connecting decoy 100 to other decoys if desired. Keel 103 is hollow and may contain sand that acts as a ballast for decoy 100. A removable cap 107 provides an access point for sand to be installed in, or removed from, keel 103.

FIG. 1D shows a bottom perspective view of decoy 100 prior to mounting the disclosed retrofit propulsion apparatus (RPA) 200 (not shown) on decoy 100. FIG. 1D depicts the I-beam-like keel 103 formed by decoy bottom 102, keel vertical member 104 and keel bottom member 105, but more clearly seen in FIG. 1C.

FIG. 1E shows a bottom perspective view of decoy 100 after the user slidably mounts the disclosed retrofit propulsion apparatus (RPA) 200 on decoy 100. To slidably mount RPA 200 on decoy 100, the user slides RPA 200 over keel 103 as discussed in more detail below.

RPA 200 includes a housing 205 and a housing 210 that are spaced-apart and rigidly held together by a connective member 215 therebetween, as seen in FIG. 1E. Housings 205 and 210 include respective front ends 205A and 210A. Housings 205 and 210 also include respective rear ends 205B and 210B. The connective member 215 connects housing rear ends 205B and 210B together to hold housing 205 to housing 210 as an integral unit as illustrated in the embodiment of FIG. 1E.

Figure 1F:
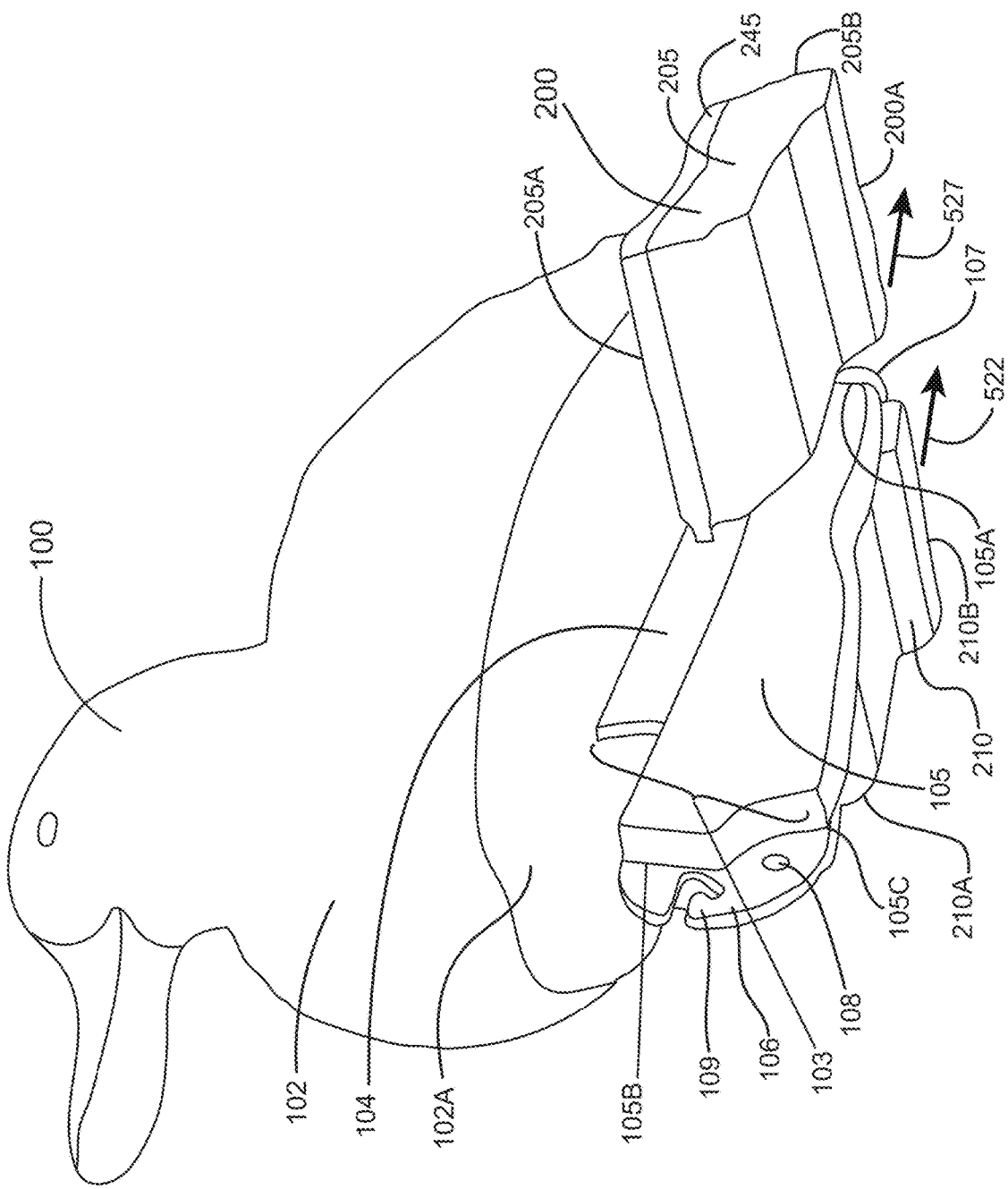
FIG. 1F another bottom perspective view the disclosed retrofittable propulsion apparatus shown mounted on the keel of the decoy of FIG. 1A.

Water propulsion devices 520 and 525 (shown as dashed lines) are situated in housings 205 and 210, respectively. Waterjet devices such as water pumps with water intakes and water output nozzles may be used as water propulsion devices 520 and 525 to provide rearward thrust. Arrows 522 and 527 indicate the direction of the water jets flowing from water output nozzles 520A and 520B (FIG. 5C) of water propulsion devices 520 and 525, respectively, to propel and steer avian decoy 100 forward. FIG. 1F depicts a bottom perspective view of decoy 100 with RPA 200 mounted thereon as viewed from the front bottom of RPA 200. In this view, cover 245 is situated atop housing 205 to close housing 205 as described in more detail below. Although not visible in FIG. 1F, the same cover 245 extends over and atop housing 210 to close housing 210.

Figure 1G:
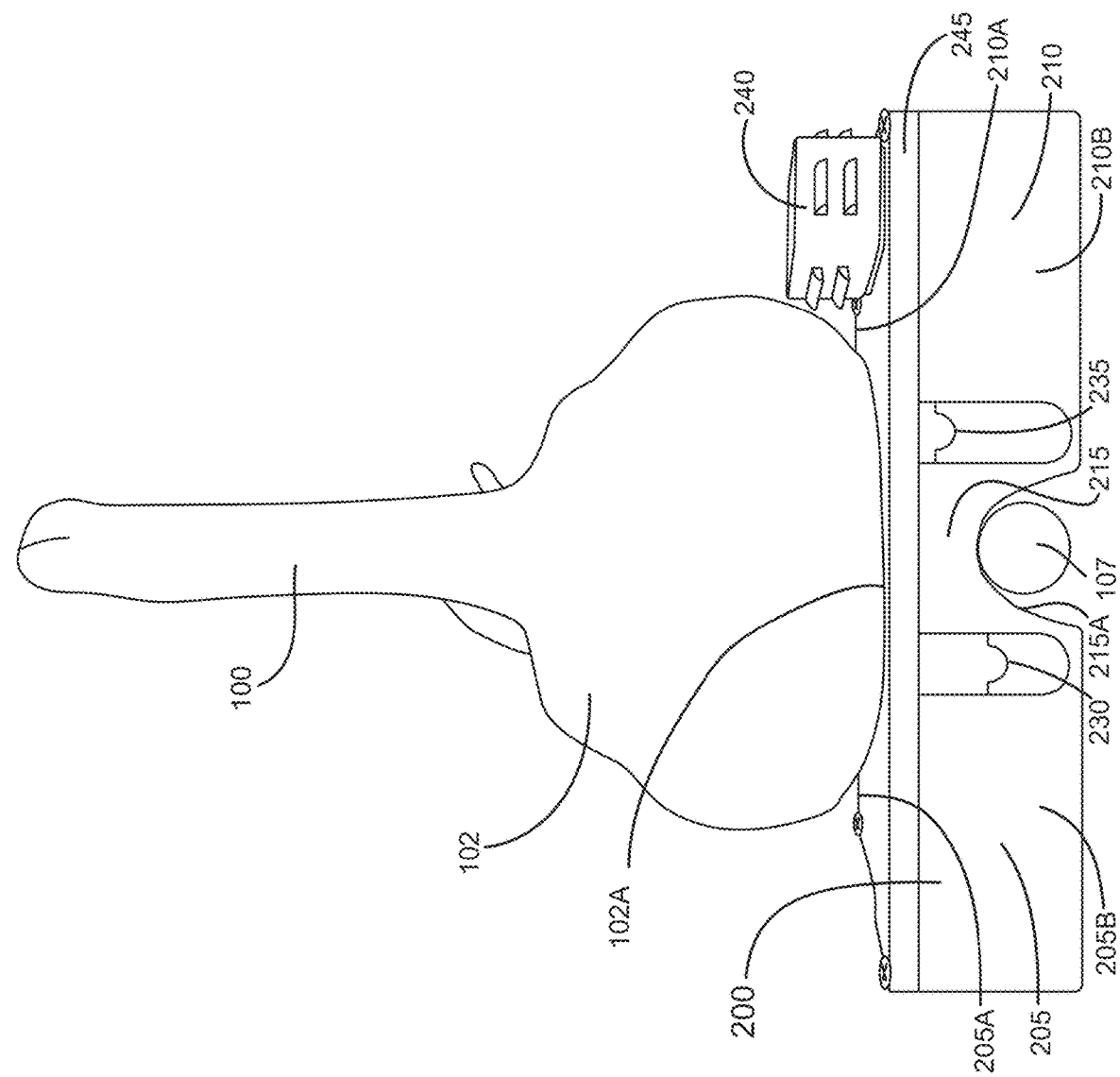
FIG. 1G is a rear perspective interior view of the disclosed retrofittable propulsion apparatus shown mounted on the keel of the decoy of FIG. 1A.

FIG. 1G shows a rear view of RPA 200 after mounting RPA 200 on decoy 100. Housing 205 connects to housing 210 via connective member 215 therebetween as shown. In this embodiment, cap 107 of keel 103 rests in a channel 215A of connective member 215 when the user mounts RPA 200 to decoy 100. In this particular embodiment, channel 215A is shaped as an inverted U. Channel 215A is sufficiently wide to receive cap 107 of the decoy's keel.

Housing 205 includes an opening 230 through which a nozzle (not shown in this view) of water propulsion device 520 ejects water to propel and steer decoy 100. Similarly, housing 210 includes an opening 235 through which a nozzle (not shown in this view) of water propulsion device 525 ejects water to propel and steer decoy 100. In one embodiment, connective member 215 is integrally formed together with housings 205 and 210. Channel 215A is situated in connective member 215 between waterjet openings 230 and 235.

Figure 1H:
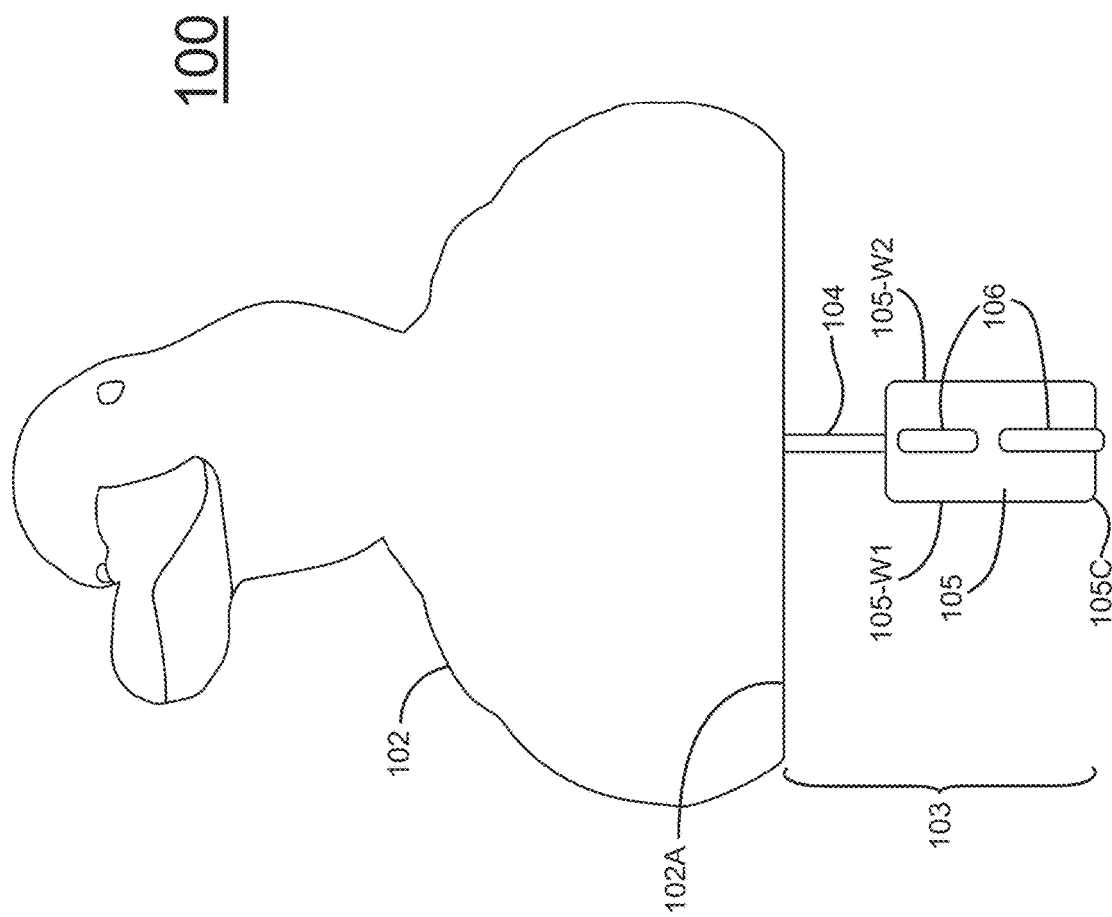
FIG. 1H is a front plan view of the decoy of FIG. 1A showing the keel.
Figure 11:
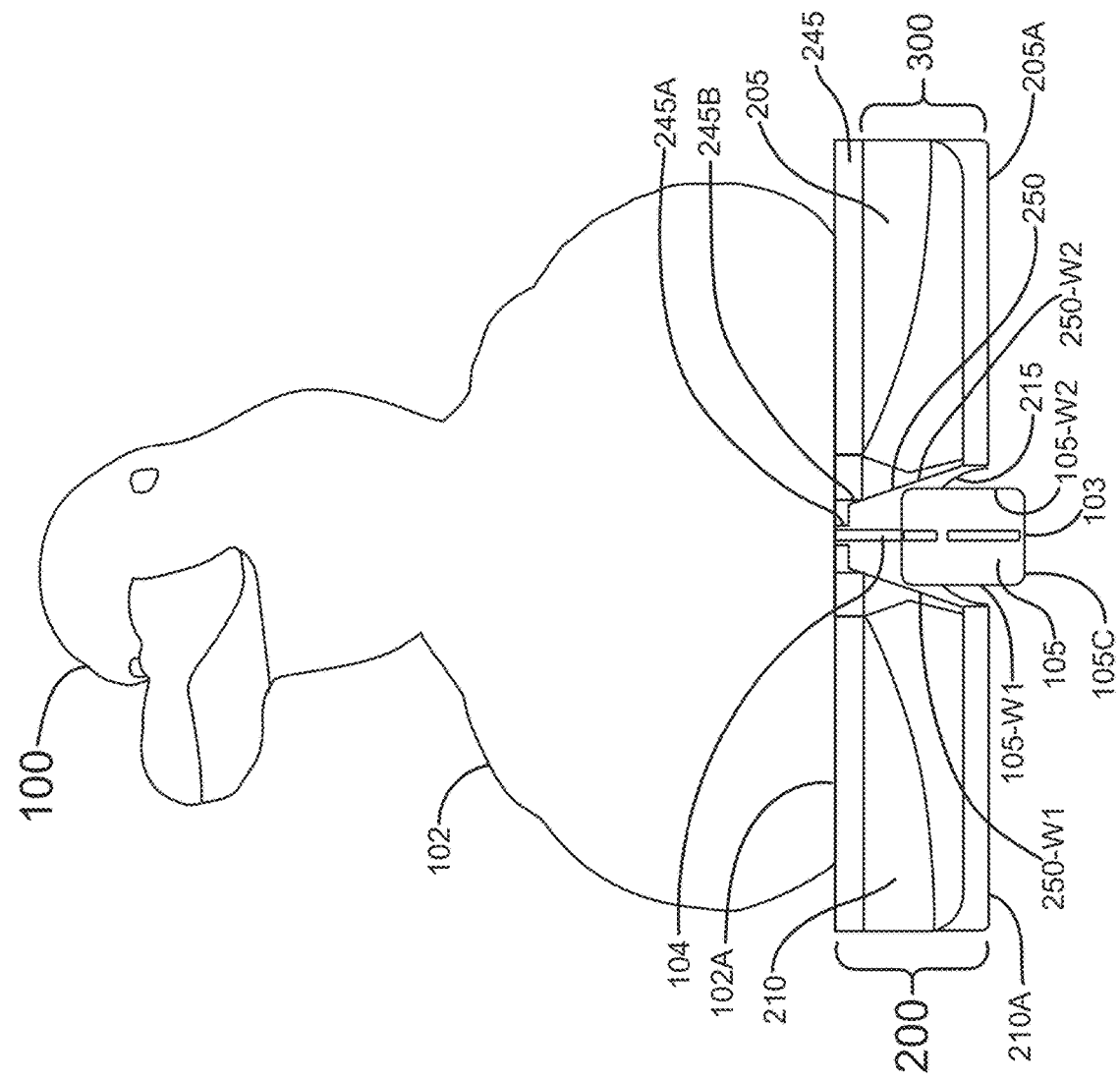

FIG. 1H shows a front plan view of decoy 100 before the user mounts RPA 200 to decoy 100. The I-beam geometry of keel 103 is readily seen in FIG. 1H which shows: 1) bottom surface 102A that forms the upper part of the "I", 2) vertical keel member 104 that forms the middle portion of the "I", and 3) keel bottom member 105 that forms the lower part of the "I". Keel bottom member 105 includes spaced-apart vertical side walls 105-W1 and 105-W2.

FIG. 1I shows the same decoy 100 of FIG. H, but also illustrates the RPA 200 mounted on the keel 103 of decoy 100. As noted above, housing cover 245 is situated atop housings 205 and 210 to close these housings. The portion of housing cover 245 above connective member 215 rests atop connective member 215 to close connective member 215. Housing cover 245 includes a slot 245A that is sufficiently wide to enable keel vertical member 104 to slide through slot 245A as RPA 200 mounts on decoy 100. Immediately below slot 245A, cover 245 further includes a channel 245B that flares outwardly downward, e.g. angles outward from its top to its bottom, as shown. Channel 245B is substantially wider than slot 245A such that channel 245B is sufficiently wide to allow keel structures having geometries different from keel 103 to be situated therein.

Immediately below channel 245B, housings 205 and 210 of RPA 200 include a channel 250 formed by angled side walls 250-W1 and 250-W2 that flare outwardly downward, e.g. angle outward from the top thereof to the bottom thereof, such that channel 250 is sufficiently wide to allow keel structures wider than keel vertical member 104 to be situated therein. For example, as seen in FIG. 1I, channel 250 is sufficiently wide to accommodate the vertical side walls 105-W1 and 105-W2 of keel bottom member 105 therein. It is noted that in this particular embodiment, the outward flare angle of channel 250 (as measured from vertical) matches the outward flare angle of channel 245B (as measured from vertical) such that together channel 250 and 245B form a continuous channel that is sufficiently wide to allow keel structures wider than, and/or different geometries than, keel vertical member 104 to be situated therein.

As seen in FIG. 1I, retrofit propulsion apparatus (RPA) 200 includes housing 205, housing 210, connective member 215 and cover 245. Considered together, housing 205, housing 210 and connective member 215 may be designated as drive assembly 300. Drive assembly 300 is described in more detail in the discussion of FIGS. 3A-1 to 3H below. Cover 245 is described in more detail in the discussion of FIGS. 4A to 4I below wherein cover 400 is described as being suitable for use as cover 245. In that case, drive assembly 300 and its associated cover 400 together form RPA 200.

Returning to FIG. 1I, the user mounts RPA 200 on decoy 100 by sliding slot 245A of cover 245 over keel vertical member 104 from the rear of decoy 100. Slot 245A of cover 245 is sufficiently wide to accommodate the width of keel vertical member 104 therein. During this sliding action, keel vertical member 104 also fits through channel 245B below slot 245A. Also during this same sliding action, the vertical side walls 105-W1 and 105-W2 of keel 103 fit between the angled walls 250-W1 and 250-W2, respectively, of channel 250 of the drive assembly 300 formed by housings 205, 210 and connective member 215.

FIG. 1J shows a representative alternative decoy 150 including a keel 153 that exhibits a keel geometry different from the keel geometry of decoy 100 of FIGS. 1A-1E. FIG. 1K shows a bottom plan view of alterative decoy 150. Although the keel geometry of keel 153 of alternative decoy 150 is very different from that of decoy 100, the same RPA 200 is nevertheless mountable to alternative decoy 150 by a sliding action. As best seen in FIG. 1L, the geometry of keel 153 includes a keel vertical member 154 that is much shorter than keel vertical member 104 of alternative decoy 100. Also, the keel bottom member 155 of alternative decoy 150 is much wider than keel bottom member 105 of decoy 100. Moreover, the geometry of keel bottom member 155 of alternative decoy 150 exhibits angled side walls 155-W1 and 155-W2 as compared with the vertical side walls of decoy 100.

Figure 1M:
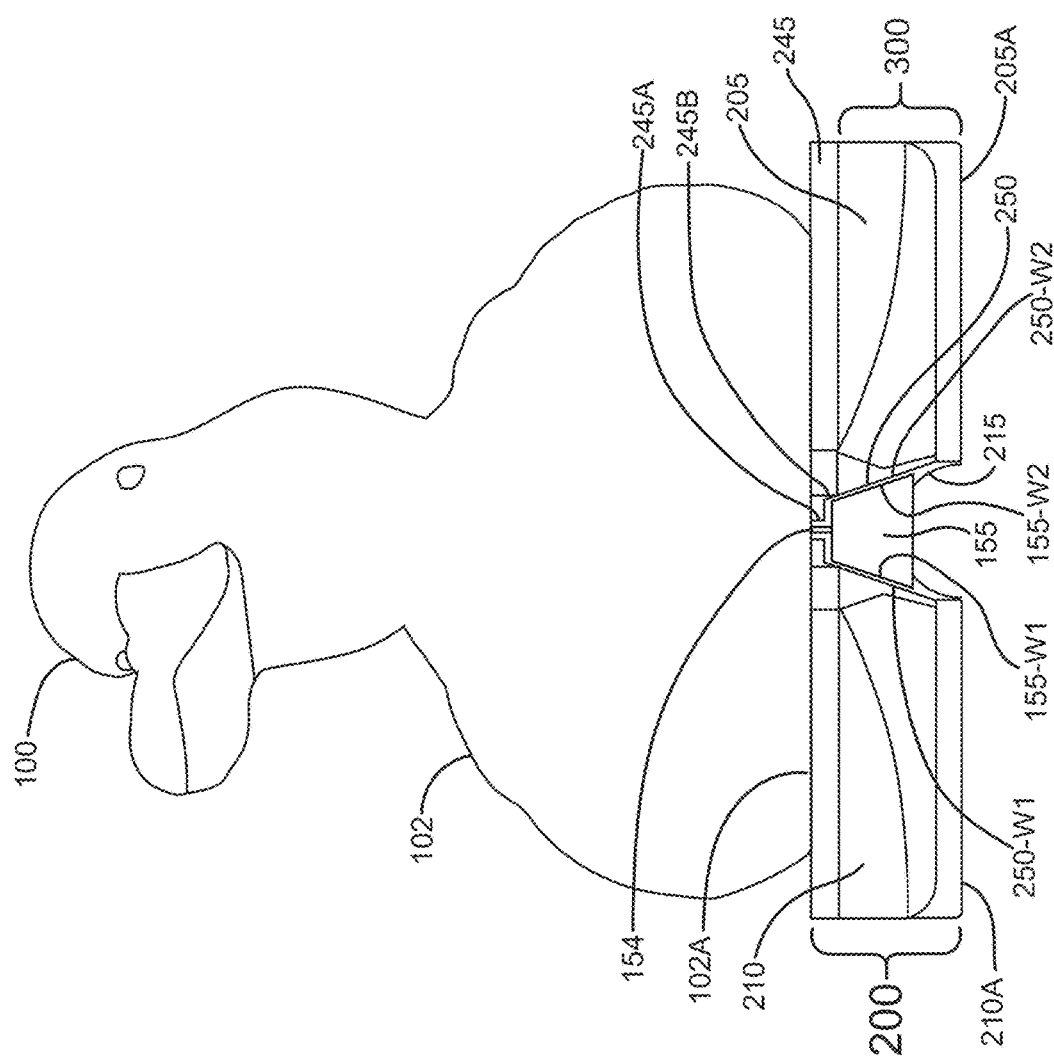
FIG. 1M is a front plan view of the decoy with the alternative geometry keel of FIG. 1L to which the disclosed retrofit propulsion apparatus may be attached.

FIG. 1M shows RPA 200 mounted on alternative decoy 150. Keel bottom member 155 includes angled side walls 155-W1 and 155-W2 that respectively fit between angled side walls 250-W1 and 250-W2 of housing channel 250. More particularly, the angled geometry of angled side walls 250-W1 and 250-W2 of housing channel 250 matches the angled geometry of angled side walls 155-W1 and 155-W2 of keel bottom member 155. Moreover, the angled geometry of angled side walls 250-W1 and 250-W2 of housing channel 250 matches the angled geometry of the angled side walls of channel 245B of cover 245, as seen in FIG. 1M immediately below keel vertical member 154. In more detail, in one embodiment the angles of side walls 250-W1 and 250-W2 of housing channel 250 with respect to the vertical approximately equals the angles of the side walls 155-W1 and 155-W2, respectively, of keel bottom member 155. Space may be allowed between angled side walls 250-W1 and 250-W2 of housing channel 250 and the angled side walls 155-W1 and 155-W2, respectively, to ease mounting of RPA 200 on alternative decoy 150. In this manner, RPA 200 easily slidably mounts to alternative decoy 150.

Figure 2A:
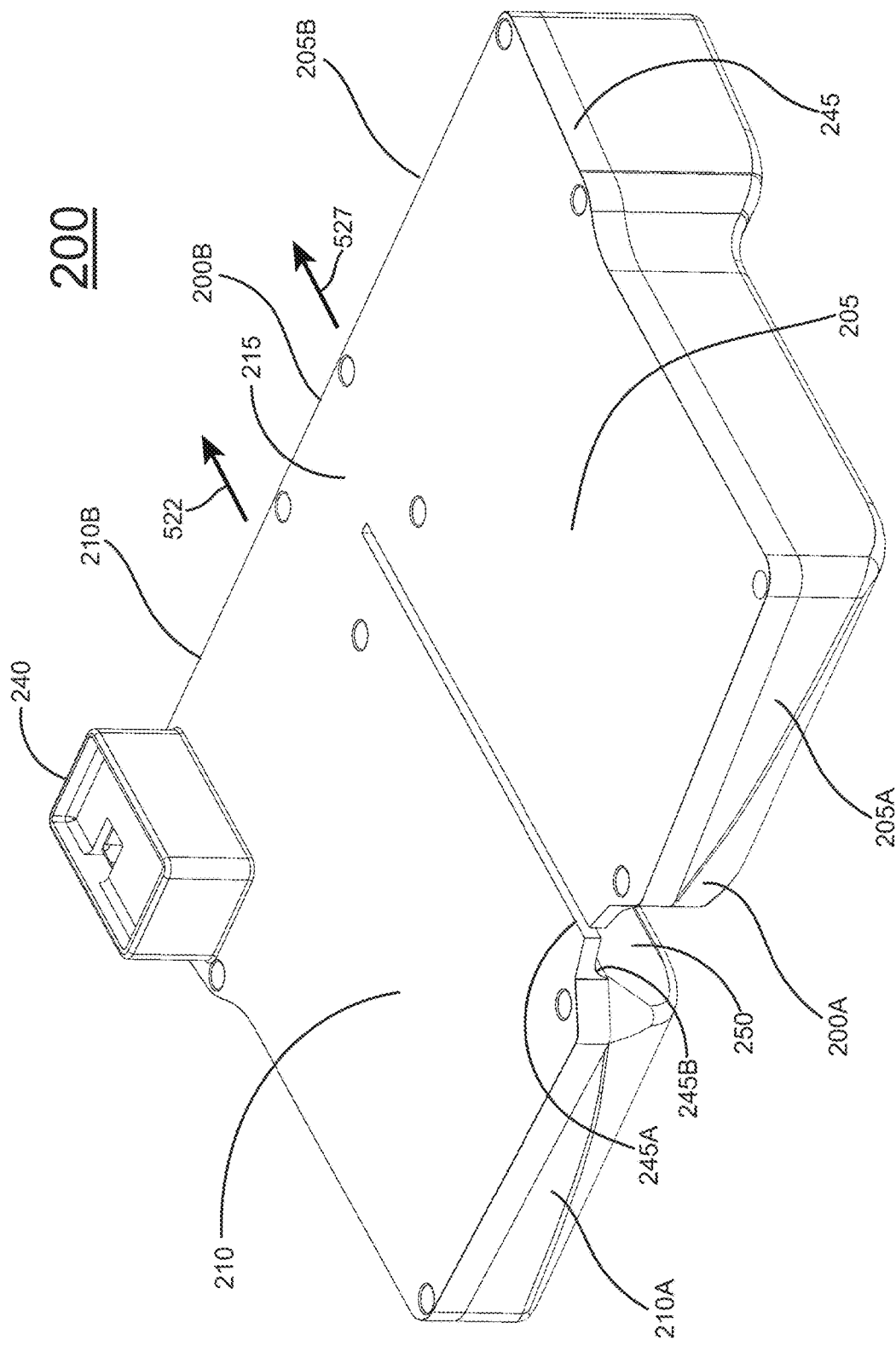
FIG. 2A is a top front right perspective view of one embodiment of the disclosed the retrofit propulsion apparatus (RPA).

FIG. 2A shows a perspective view of RPA 200. RPA 200 includes housings 205 and 210 that are each covered by a portion of cover 245. Housings 205 and 210 are partially separated by a slot 245A therebetween. In one embodiment, housings 205 and 210 house respective water pumps that eject water from rear end 200B of RPA 100 in the direction of arrows 522 and 527 to provide propulsive force and steering to a selected decoy when RPA 200 is mounted on the selected decoy. A connective member 215 connects housings 205 and 210 together. Connective member 215 may be integrally formed as part of housings 205 and 210 as illustrated in FIG. 2A.

Figure 2B:
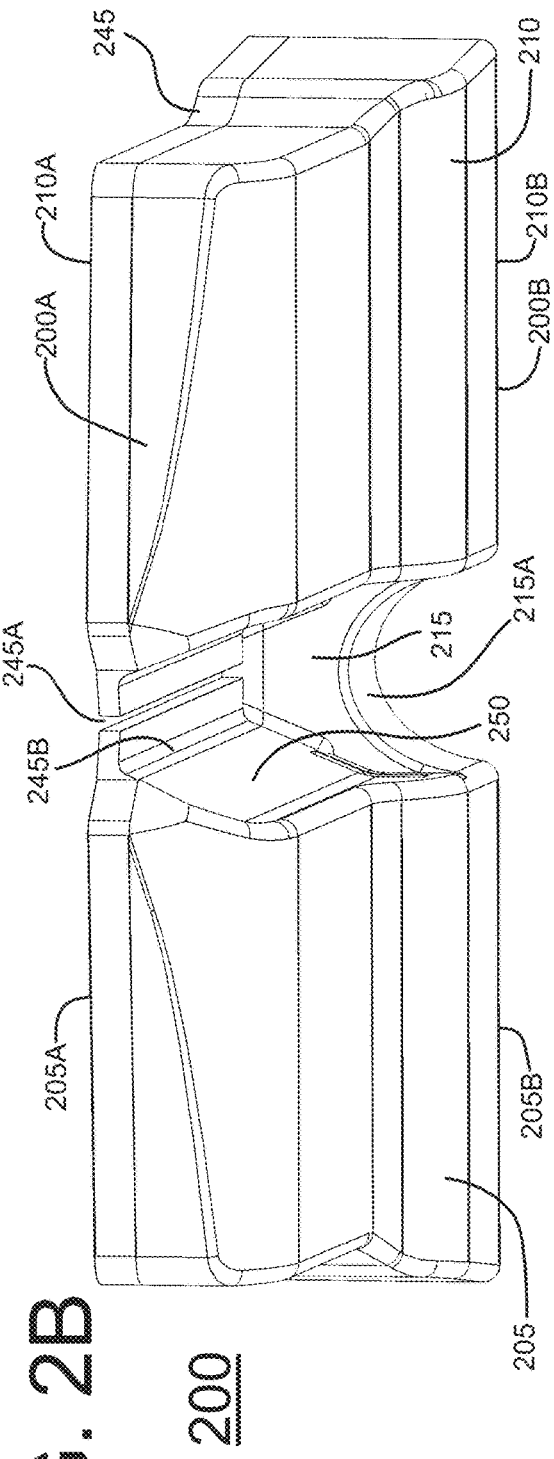
FIG. 2B is a bottom front perspective view of the RPA embodiment of FIG. 2A.
Figure 2C:
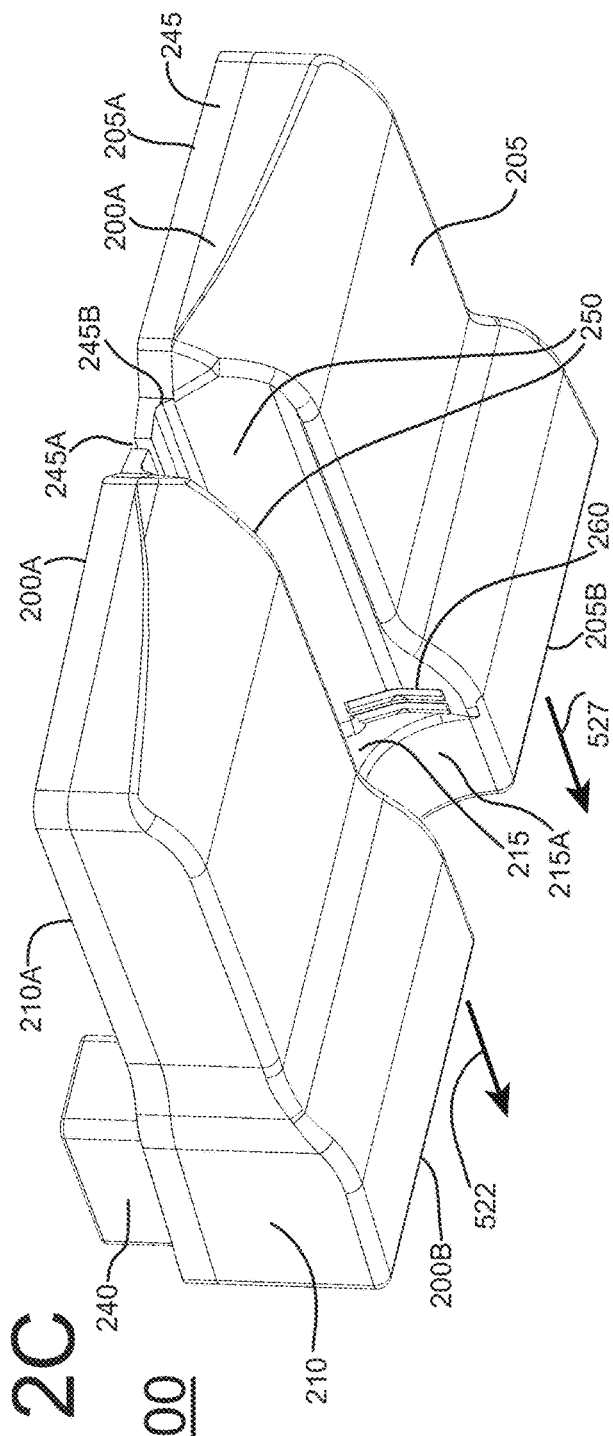
FIG. 2C is a bottom front left perspective view of the RPA embodiment of FIG. 2A.

FIGS. 2B and 2C show RPA 200 from different lower perspectives. Connective member 215 is readily seen in FIG. 2B as connecting housings 205 and 210 together. Connective member 215 includes an inverted U-shaped channel 215A in which cap 107 of decoy 100 rests when RPA 200 is mounted to decoy 100. During this mounting, slot 245A of RPA 200 slidably receives a keel vertical member, such as keel vertical member 104 of FIG. 1C, or such as keel vertical member 154 of FIG. 1L. Slot 245A is dimensioned sufficiently wider than keel vertical members 104 or 154 to allow slot 245 to receive either of these keel vertical members. As noted above with reference to FIG. 1I, the flared geometry of channel 245B and 250 together provide an open region that is sufficiently wide to receive decoy keel structures wider than those that slot 245 slidably receives. In this manner, wider decoy keel structures such as keel bottom member 105 of FIG. 1C or such as member 155 of FIG. 1L may be received by RPA 200 during the mounting of RPA 200 to a selected decoy. As shown in FIG. 2C, RPA 200 includes a water intake 260 to supply water to the water propulsion devices interior to RPA 200 for use in propelling and steering RPA 200 that is attached to a selected decoy.

FIG. 2D is a rear plan view of RPA 200 that shows connective member 215 situated between housings 205 and 210. More specifically, connective member 215 is situated between openings 230 and 235 as shown in this embodiment. Connective member 215 includes an inverted U-shaped channel 215A in which a keel cap (not shown) may rest. Channel 215A may also be an inverted semicircle or other open geometry in which a keel cap may rest. FIG. 2D depicts RF transceiver tower 240 before a cover seal member (not shown) is situated thereon to seal out water from electrical circuitry that is situated in transceiver tower 240. FIG. 2E is a front plan view of RPA 200 that shows cover 245 as including slot 245A for receiving a narrow part of a keel such as a keel vertical member. Cover 245 also includes the wider channel 245B. Housings 205 and 210 together include a channel 250 that is aligned with channel 245, each channel having the same angle with respect to vertical such that one channel smoothly transitions to the other channel to give the appearance that channel 245B and 250 together form a single, contiguous channel that receives keel portions that are wider than the narrow vertical member of the decoy keel. FIG. 2F is a right plan view of housing 205 of RPA 200. FIG. 2G is a left plan view of housing 210 of RPA 200.

FIGS. 2A-2G, as discussed above, show the fully assembled retrofit propulsion apparatus (RPA) 200 including cover 245 and external housing structures below cover 245. These external housing structures below cover 245 form a drive assembly that includes housing 205, housing 210 and connective member 215.

Figures 1, 3A:
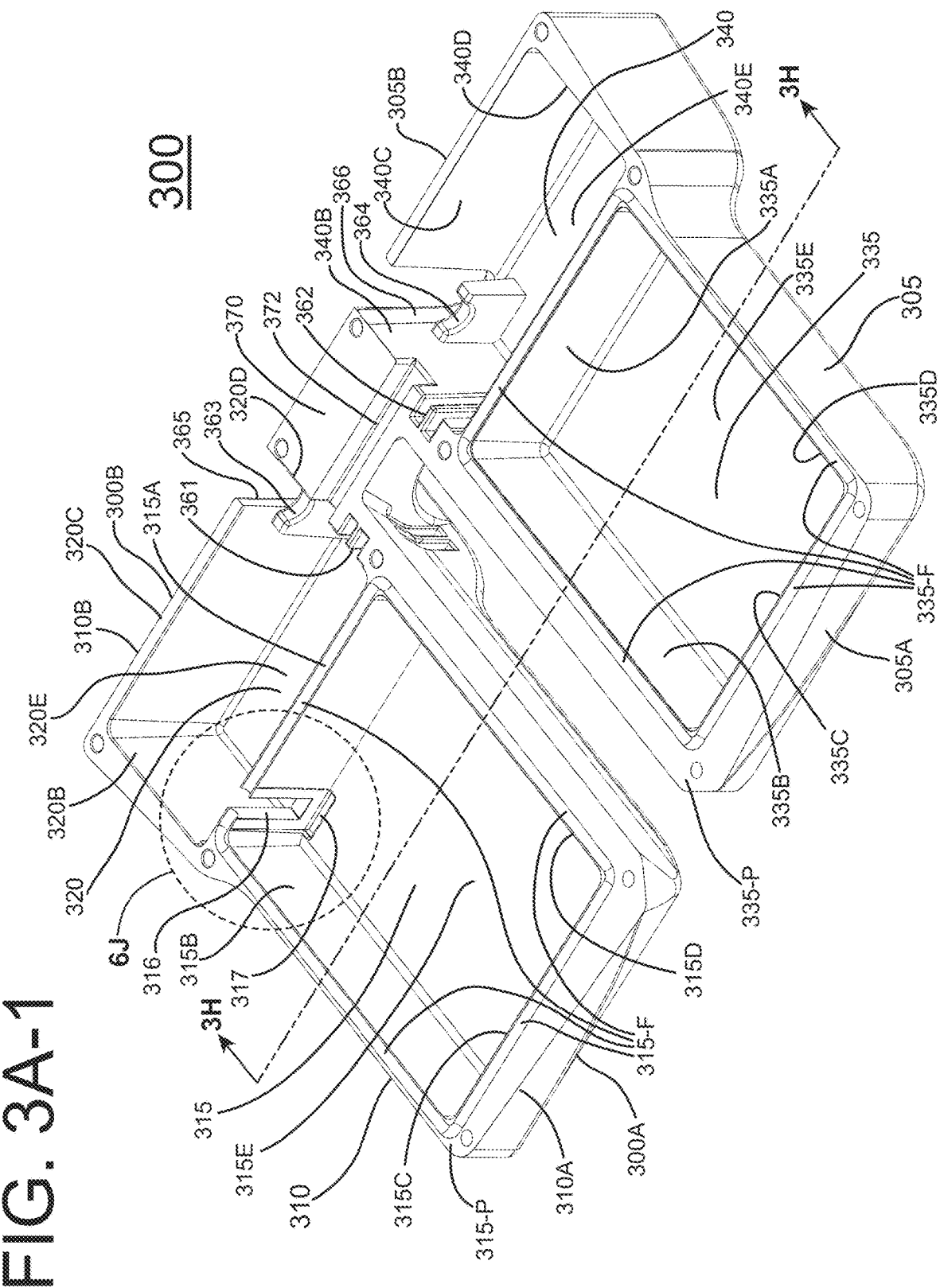
FIG. 3A-1 is a top right perspective view of a drive assembly that may be employed as the drive assembly of FIG. 2A.

FIG. 3A-1 is a top right perspective view of a drive assembly 300 having many elements in common with the drive assembly formed by housing 205, housing 210 and connective member 215 of FIGS. 2A-2G. When comparing drive assembly 300 of FIGS. 3A1-3H with the drive assembly of FIGS. 2A-2G, similar numbers and similar component names indicate similar elements. For example, housing 305, housing 310, and connective member 315 of drive assembly 300 of FIGS. 3A1-3H FIG. are the same or similar to housing 205, housing 210, and connective member 215 of the drive assembly of FIGS. 2A-2G. Drive assembly 300, as viewed in FIG. 3A-1 before components are installed therein, may be fabricated of acrylonitrile butadiene styrene (ABS) plastic, polyvinylchloride (PVC), polyethylene, polypropylene, or thermoplastic polyurethane (TPU), for example.

Drive assembly 300 of FIG. 3A-1 includes a front end 300A and a rear end 300B. Drive assembly 300 further includes a housing 305 and a housing 310 which are illustrated prior to installation of cover 400 atop drive assembly 300. Cover 400 may be the same or similar to cover 245 of FIGS. 2A-2F which show the fully assembled RPA 200.

Housing 310 includes a housing front 310A and a housing rear 310B. Housing 310 also includes a chamber 315 and an antechamber 320 situated between housing front 310A and housing rear 310B. In more detail, chamber 315 includes four walls 315A, 315B, 315C, 315D and a floor 315E that together form a generally parallelepiped geometry in this embodiment. Antechamber 320 is situated adjacent, and to the rear of, chamber 315 in FIG. 3A-1. Antechamber 320 includes four walls 320A, 320B, 320C, 320D and a floor 320E. Wall 315A is a shared wall that chamber 315 and antechamber 320 share. Wall 315A includes a wall opening 316 that enables multiple discrete electrical wires to pass between electrical apparatus in chamber 315 and antechamber 320 via a grommet structure (not shown) discussed in more detail below. A floor indentation 317 is situated at the base of wall opening 316 to receive a portion of the grommet structure when the grommet structure is mounted in wall opening 316.

Housing 305 includes a housing front 305A and a housing rear 305B. Housing 305 further includes a chamber 335 and an antechamber 340. More specifically, chamber 335 includes four walls 335A, 335B, 335C, 335D and a floor 335E that together form a generally parallelepiped geometry in this embodiment. Antechamber 340 is situated adjacent and to the rear of chamber 335 in FIG. 3A-1. Antechamber 340 includes four walls 340A, 340B, 340C, 340D and a floor 340E. Wall 335A is a shared wall that chamber 335 and antechamber 340 share.

As will become clear from the discussion below with reference to FIGS. 3A-1 to-3H, chamber 320 houses electronic power and control apparatus that drive respective water propulsion devices (not shown) in antechambers 320 and 340 to propel and controllably steer a decoy outfitted with RPA 200. Antechambers 320 and 340 are respectively situated adjacent housing rear 305B and housing rear 310B as shown. When RPA 200 with drive assembly 300 is installed on a decoy and placed in an aquatic environment, water enters antechambers 320 and 340 via water intake vents 361 and 362, respectively. In contrast with antechambers 320 and 340, chambers 315 and 335 remain dry and sealed.

A connective member 370 connects housings 305 and 310 rigidly together. Connective member 370 need not be formed as a discrete component that is separate from housings 305 and 310. Preferably, connective member 370 is formed between adjacent portions of housings 305 and 310 as an integral part thereof using a common mold to form all three of these structures as a single structure. Connective member 370 includes wiring channel 372 for routing electrical wires from chamber 315 of housing 310 through antechamber 320 onward to antechamber 340, as described below in more detail with reference to FIG. 6Q.

Figures 2, 3A:
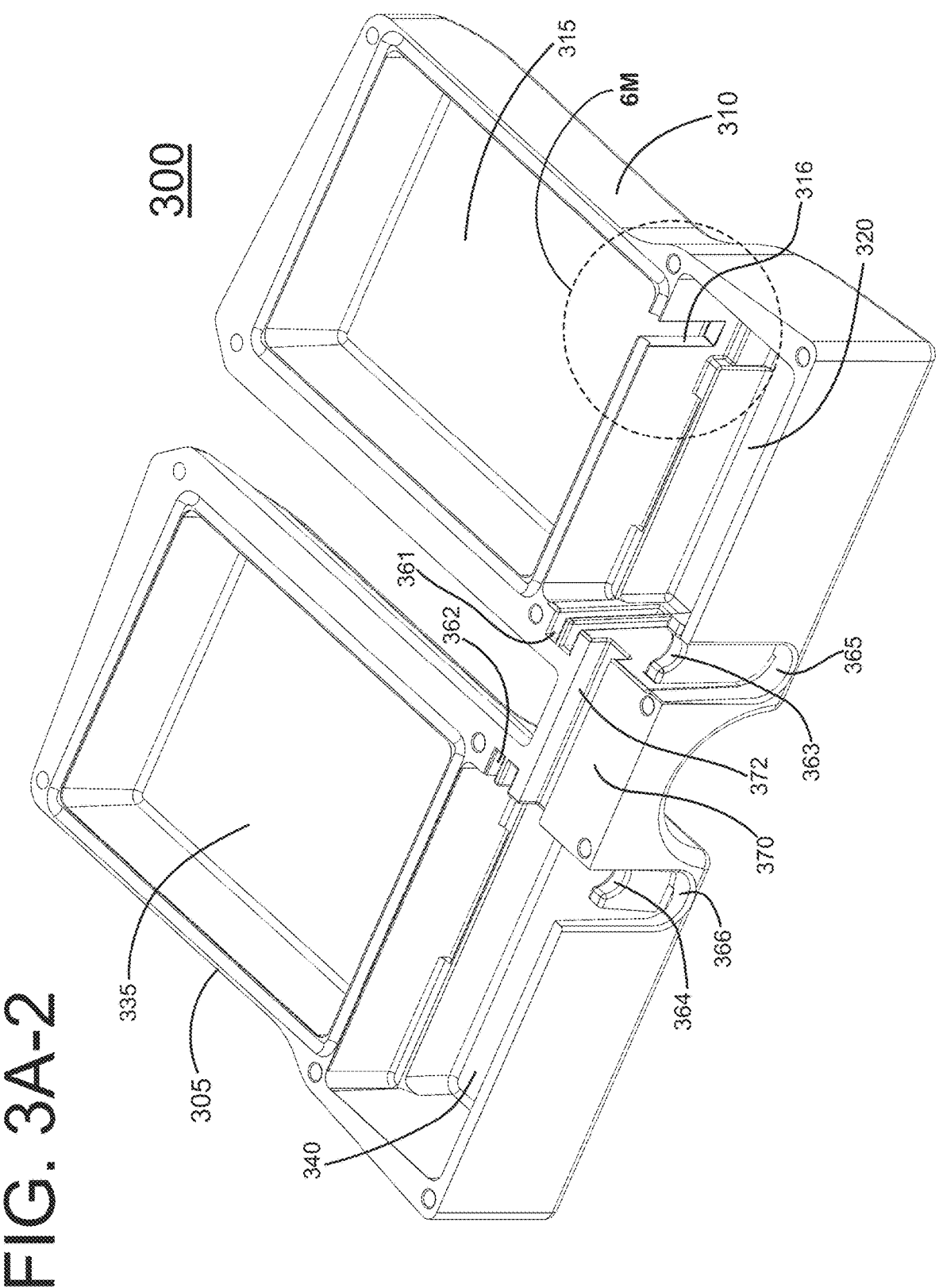

FIG. 3A-2 is a rear perspective view of drive assembly 300 that provides more detail with respect to parts of FIG. 3A-1 that may be partially obscured in FIG. 3A-1 For example, FIG. 3A-2 shows water intake vents 361, 362, exhaust nozzle supports 363, 364, and U-shaped output ports 365, 366 in more detail. FIG. 3A-2 shows drive assembly 300 before a cover 400 is later placed on housings 305 and 310 to complete RPA 200.

Figure 3D:
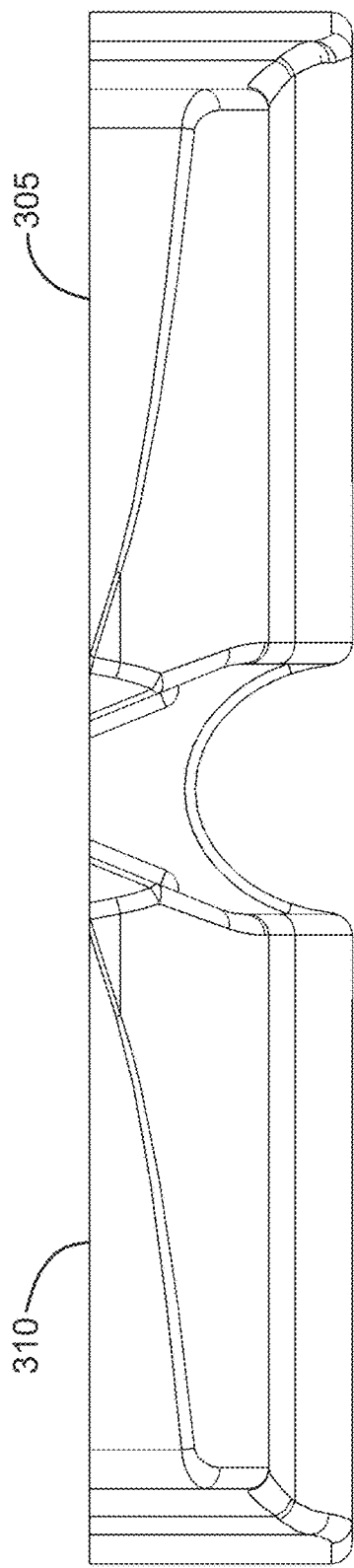
FIG. 3D is a front plan view of the drive assembly of FIG. 3A-1.
Figure 3E:
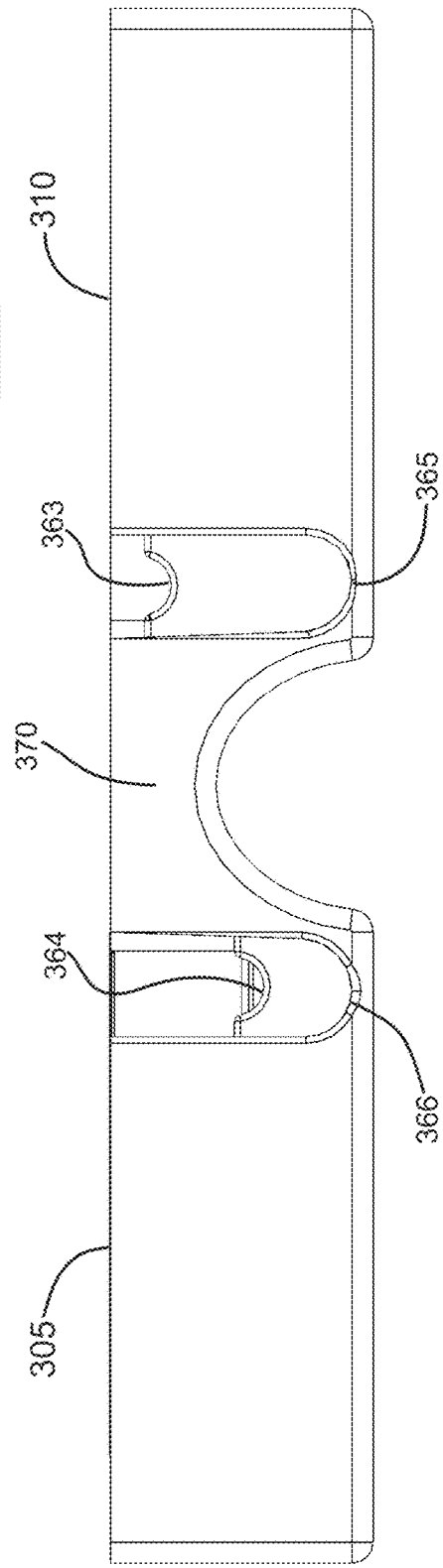
FIG. 3E is a rear plan view of the drive assembly of FIG. 3A-1.
Figure 3F:
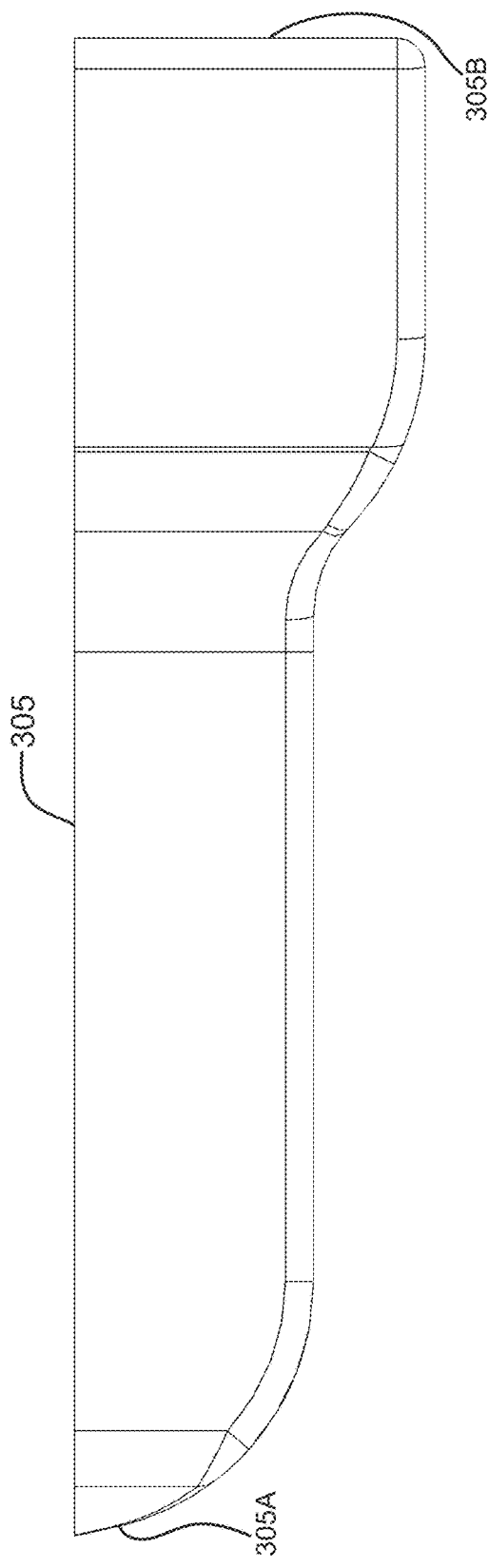
FIG. 3F is a right-side plan view of the drive assembly of FIG. 3A-1.
Figure 3G:
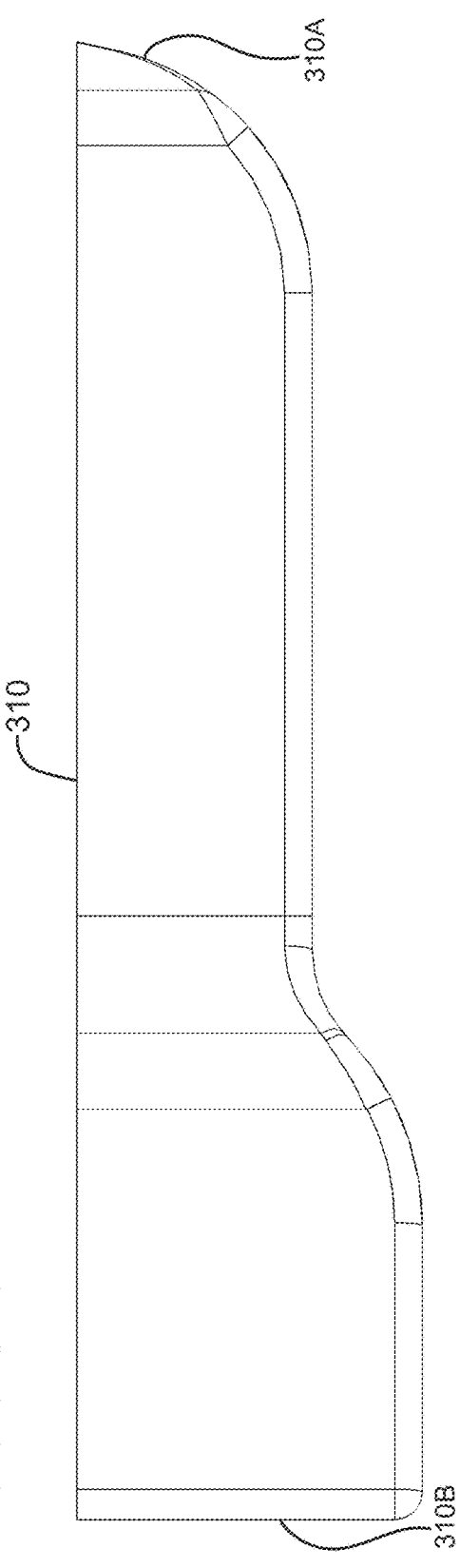
FIG. 3G is a left-side plan view of the drive assembly of FIG. 3A-1.

FIG. 3B is a top plan view of drive assembly 300 before cover 400 is placed atop housings 305 and 310. FIG. 3C is a bottom plan view of drive assembly 300 showing water intake vents 361, 362, exhaust nozzle supports 363, 364, and U-shaped output ports 365, 366. FIG. 3D is a front plan view of drive assembly 300 prior to cover 400 placement thereon. FIG. 3E is a rear plan view of drive assembly 300 before cover placement thereon. FIG. 3F is a right-side plan view of drive assembly 300 showing housing 305. FIG. 3G is a left side plan view of drive assembly 300 showing housing 310. FIGS. 3F-3G are similar to FIGS. 2F-2G except that FIGS. 3F-3G show RPA 200 without a cover such as cover 400.

Figure 3H:
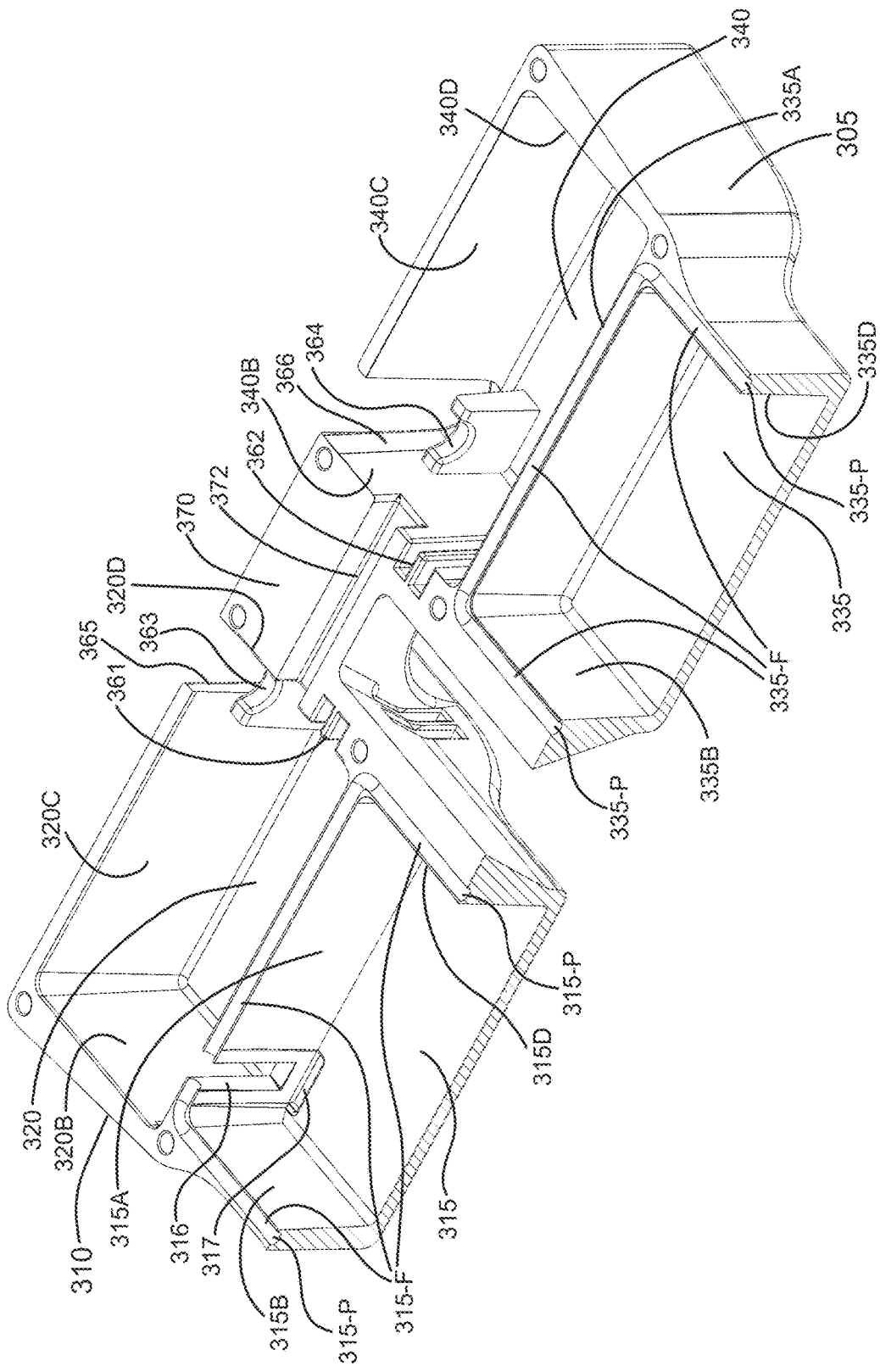
FIG. 3H is a cross-sectional view of the drive assembly of FIG. 3A-1 taken along section line 3H-3H of FIG. 3A-1.

FIG. 3H is a cross-sectional view of drive assembly 300 of RPA 200 taken along section line 3H-3H that is shown in FIG. 3A-1. Drive assembly 300 includes chambers 315 and 335 that are sealed watertight, while antechambers 320 and 340 are unsealed and receive water through water intake vents 361 and 362. Referring now to both FIG. 3A-1 and FIG. 3H, housing 310 includes a sealed watertight chamber 315 and an adjacent antechamber 320. Upper periphery 315-P of walls 315A, 315B, 315C and 315D includes a female sealing member 315-F that extends around the upper periphery 315-P of all 4 walls of chamber 315, as shown in FIG. 3A-1 and partially shown in FIG. 3H. The cross-sectional view of FIG. 3H illustrates the cross-sectional female geometry of member 315-F. In this embodiment, female sealing member 315-F exhibits a concave geometry although other female geometries, such as V-shaped, may be used as well. As seen in FIG. 3A-1, while the four sides of chamber 315 exhibit an overall rectangular geometry, the cross-sectional geometry of members 315-F is female. Likewise, while the four sides of chamber 335 exhibit an overall rectangular geometry, the cross-sectional geometry of members 335-F is female.

To seal chamber 315 watertight, a cover 400 (discussed below with reference to FIG. 4A-4I) is provided with a male sealing member 410-M (refer to FIG. 4B) that sealably mates with a corresponding female sealing member 315-F of drive assembly 300 when drive assembly 300 is closed by cover 400. Alternatively, member 410-F may be a male sealing member and 410-M may be a female sealing member that mate with one another to seal chamber 315. Likewise, to seal chamber 335 watertight, cover 400 (discussed below with reference to FIG. 4A-4I) is provided with a male sealing member 405-M that sealably mates with a corresponding female sealing member 335-F when drive assembly 300 is closed. Alternatively, member 335-F may be a male sealing member and 335-M may be a female sealing member that mate with one another to seal chamber 335.

The above discussed FIG. 3A-3H show the components of drive assembly 300 without a cover 400 that is mounted at the top of drive assembly 300 to close drive assembly 300. FIGS. 4A-4I show the features of cover 400 and are discussed below.

Figure 4A:
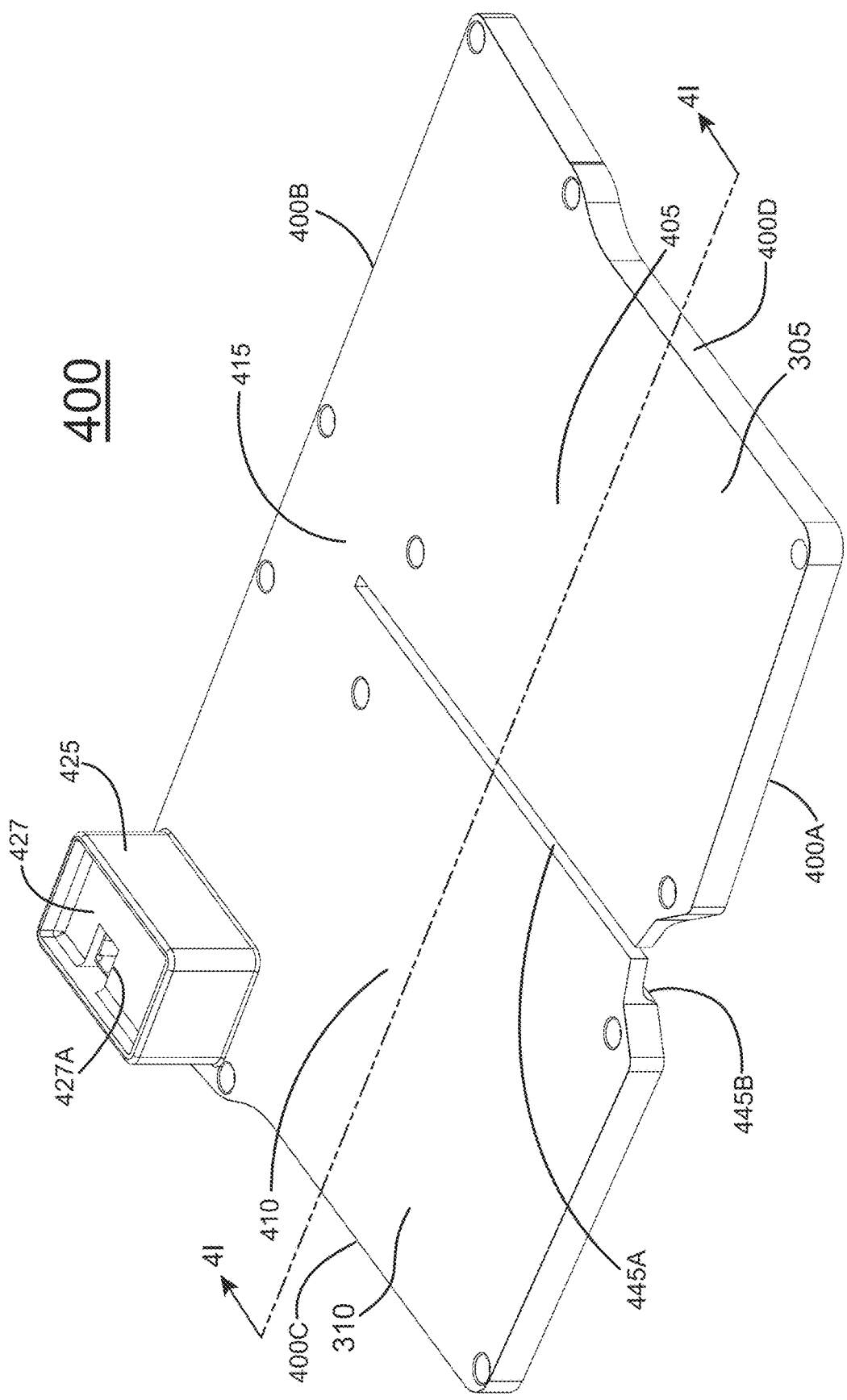
FIG. 4A is a top front perspective view of a cover that is mountable on the drive assembly to close the RPA.
Figure 4B:
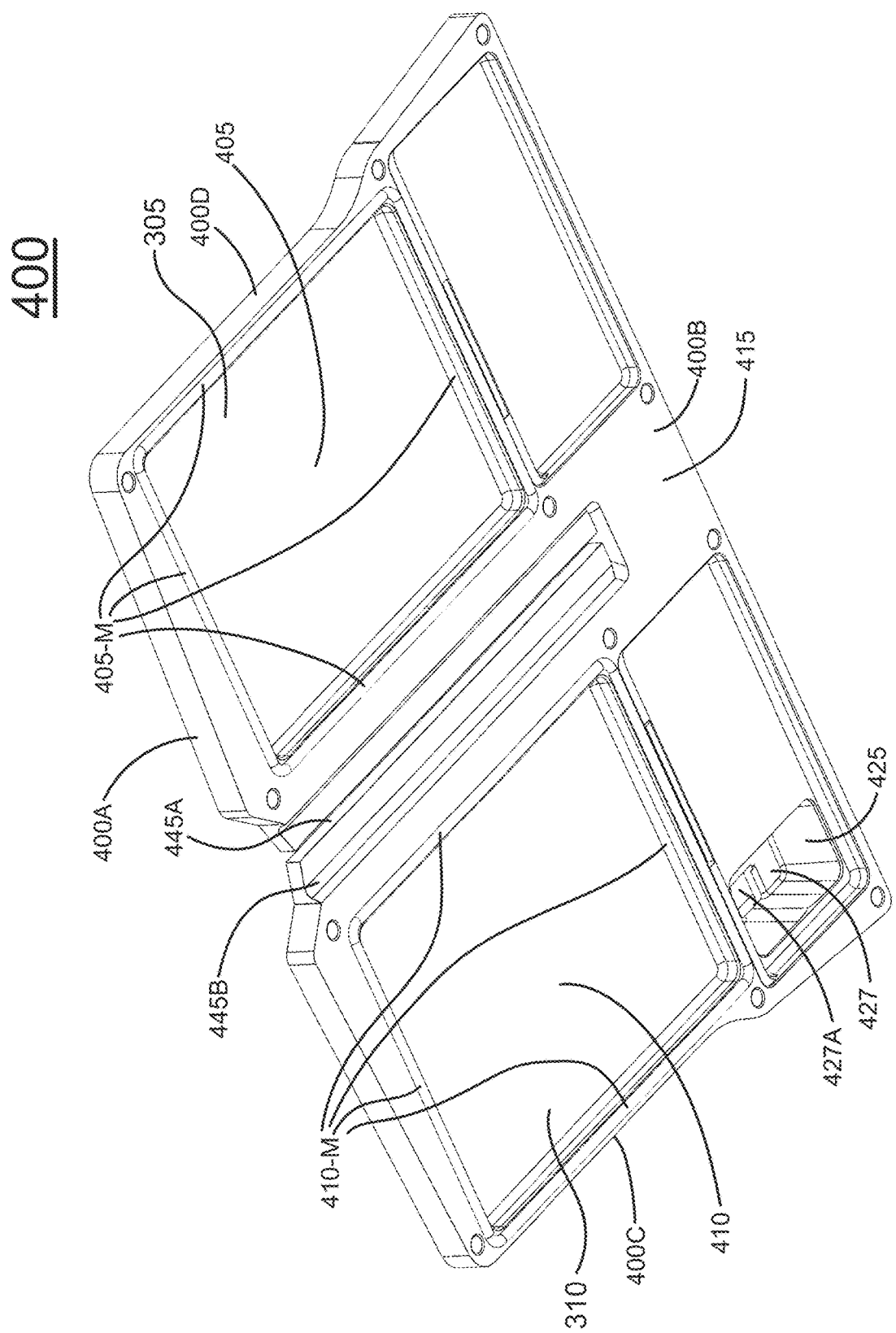
FIG. 4B is a bottom perspective view of the cover of FIG. 4A.

More particularly, FIG. 4A is a top front perspective view of cover 400 that is mountable on drive assembly 300 of FIG. 3A-1 to seal chambers 315 and 335. Cover 400 may be fabricated of the same material as drive assembly 300, namely acrylonitrile butadiene styrene (ABS) plastic, polyvinylchloride (PVC), polyethylene, polypropylene, or thermoplastic polyurethane (TPU), for example. Cover 400 includes cover front side 400A, cover back side 400B, cover left side 400C and cover right side 400D. To close drive assembly 300, the user positions cover 400 atop drive assembly 300 and screws cover 400 to drive assembly 300 as described below in more detail. FIG. 4B shows a bottom front perspective view of cover 400. FIG. 4B more clearly shows the slot 445A and channel 445B in cover 400. Slot 445A and channel 445B of FIG. 4A are similar in form and function to slot 245A and channel 245B, respectively, of FIG. 2A.

As seen in FIG. 4A, cover 400 includes an RF transceiver housing 425 for housing a control RF transceiver 607 (FIGS. 6R, 6S)) therein. RF transceiver housing 425 may also be called a transceiver tower. Transceiver housing 425 includes a housing floor 427 on which control RF transceiver 607 (not shown) may be situated. Housing floor 427 includes an opening 427A through which electrical wires are routed to connect RF transceiver 607 to circuitry within drive assembly 300, as described in more detail below with reference to FIGS. 6Q, 6R and 6S. When RPA 200 is mounted to a duck decoy, the user may employ a separate wireless mobile transceiver 720 (e.g. a smartphone, not shown in this view) to communicate with the control transceiver 607 in RF transceiver housing 425. In this manner, the user controls the propulsion and steering of the duck decoy via the user's mobile transceiver 725, as discussed in more detail below.

Cover 400 of FIG. 4A is similar to cover 245 which is the uppermost structure depicted in FIG. 2A. Cover 400 includes cover portions 405 and 410 that are joined together by connective member 415 as shown. Cover portions 405 and 410 may be formed together with connective member 415 to provide cover 400 as an integral structure. Connective member 415 joins drive assembly housing 305 together with drive assembly housing 310 like connective member 215 of FIG. 2A joins housings 205 and 210 together. Cover 400 closes housings 305 and 310 when situated at the top of housings 305 and 310.

FIG. 4B shows a bottom perspective view of cover 400. Male sealing member 405-M and male sealing member 410-M are shown on the bottom of cover 400. Male sealing member 405-M of FIG. 4B mates with female sealing member 335-F of FIG. 3A-1 to seal chamber 335. Male sealing member 405-M and female sealing member 335-F have the same overall geometry as the chamber 335 that they seal. For example, chamber 335 exhibits an overall rectangular geometry and the four sealing members 405-M and the four sealing members 335-F likewise exhibit an overall rectangular geometry. While the four sealing members 405-M exhibit this overall rectangular geometry, the cross-sectional geometry of members 405-M is female. While the four sealing members 335-F exhibit this overall rectangular geometry, the cross-sectional geometry of members 335-F is female.

Further, male sealing member 410-M of FIG. 4B mates with female sealing member 315-F of FIG. 3A-1 to seal chamber 315. Male sealing member 410-M and female sealing member 315-F have the same overall geometry as the chamber 315 that they seal. For example, chamber 315 exhibits an overall rectangular geometry and sealing members 410-M and 315-F likewise exhibit an overall rectangular geometry. While the four sealing members 410-M exhibit this overall rectangular geometry, the cross-sectional geometry of members 410-M is female. While the four sealing members 315-F exhibit this overall rectangular geometry, the cross-sectional geometry of members 315-F is female. Other chamber overall geometries may be employed as well. For example, if chambers 315 and 335 use overall square geometries, then the mating seals also employ such square geometries so that the male sealing members and female sealing members properly mate and seal chambers 315 and 335.

Figure 4C:
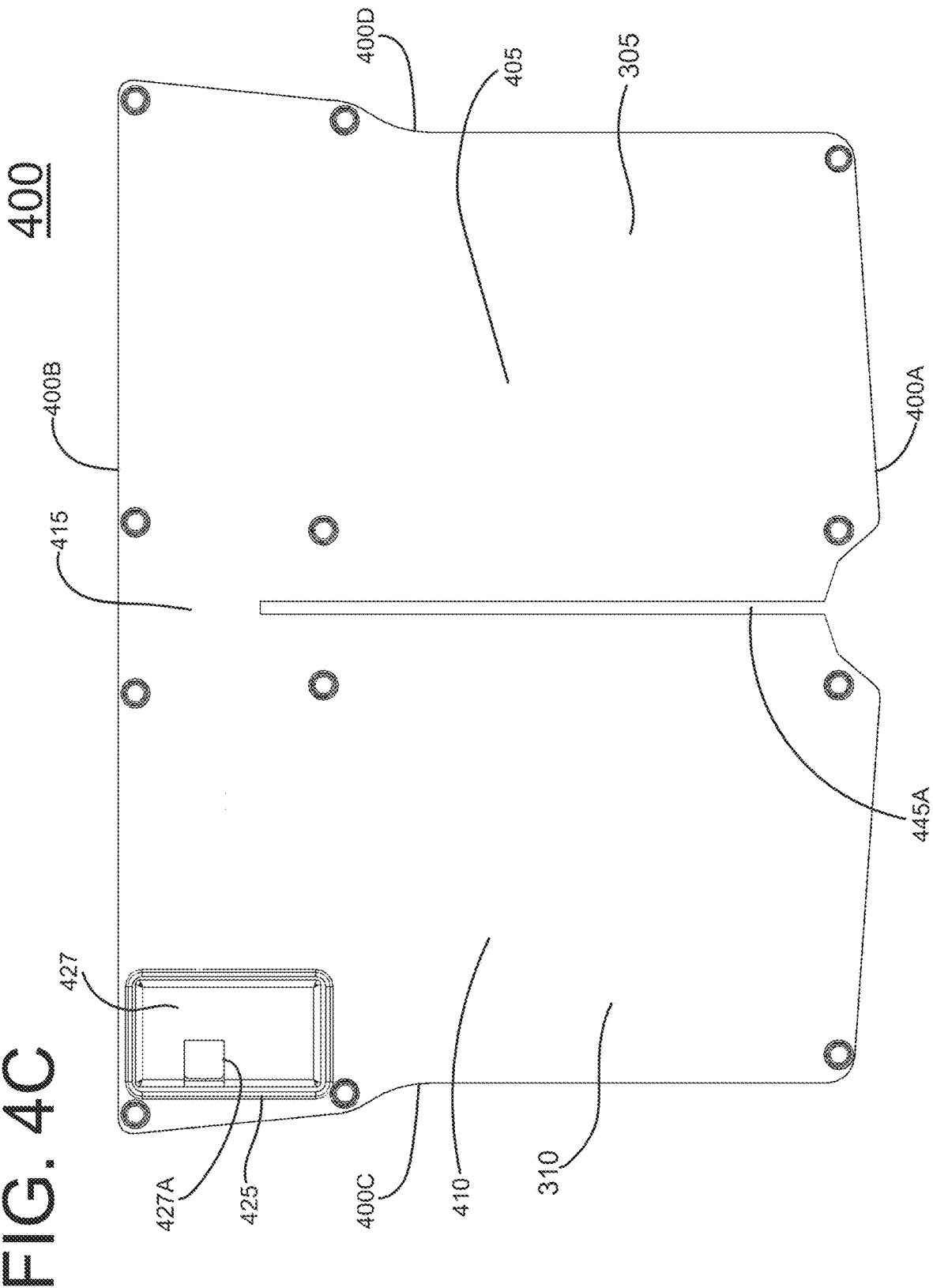
FIG. 4C shows a top plan view of the cover of FIG. 4A.

Structures that assist in mounting RPA 200 to decoy 100 are now discussed. FIG. 4C shows a top plan view of cover 400 that includes slot 445A and connective member 415.

Figure 4D:
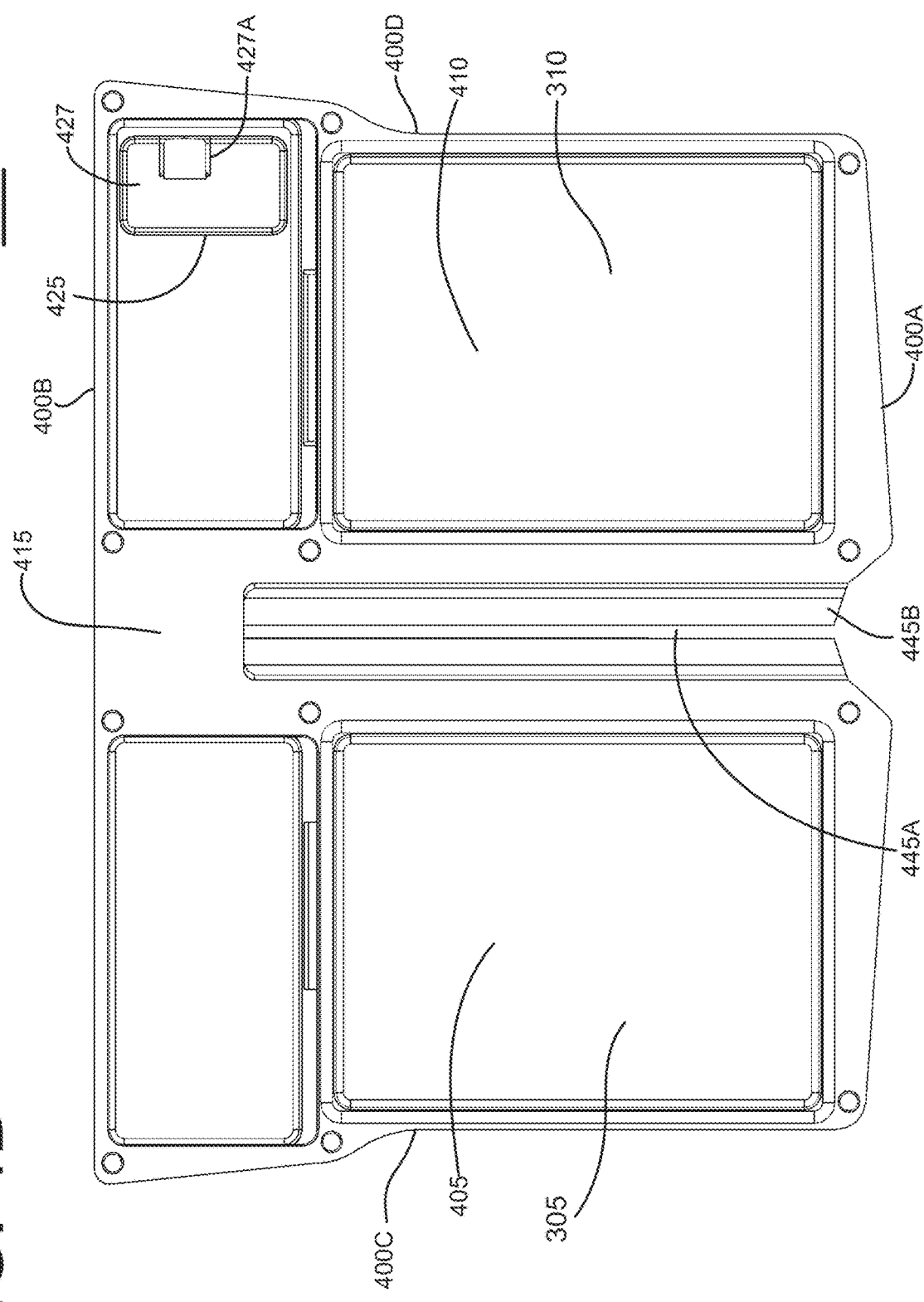
FIG. 4D shows a bottom plan view of the cover of FIG. 4A
Figure 4E:
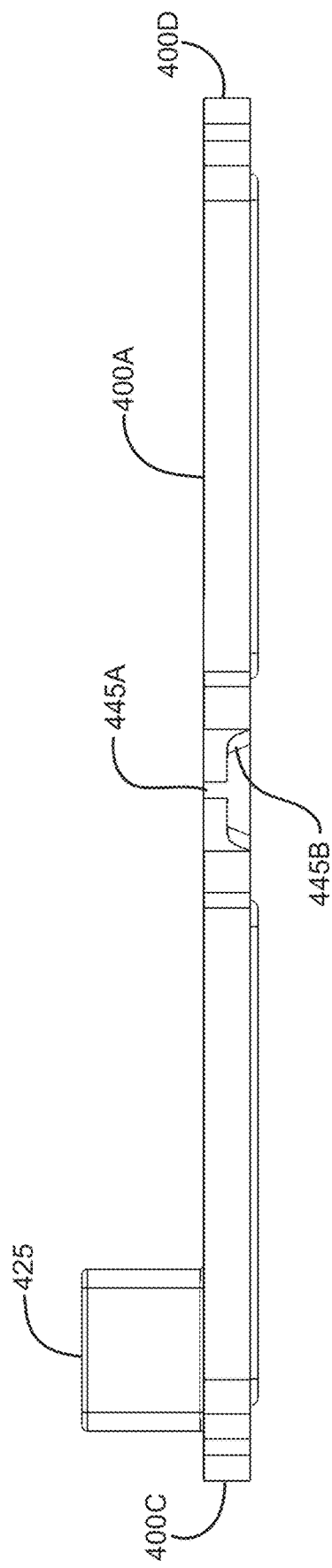
FIG. 4E shows a front plan view of the cover of FIG. 4A.
Figure 4F:
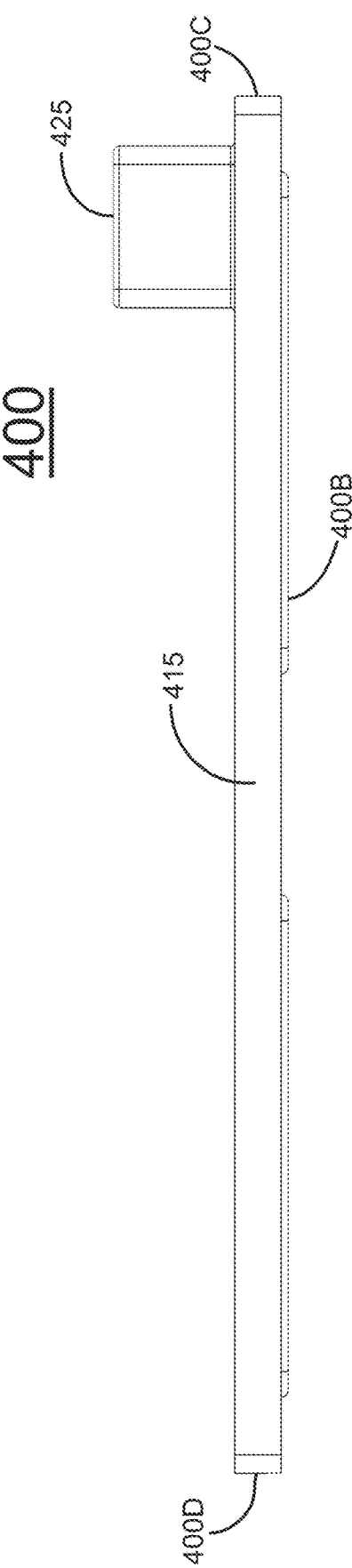
FIG. 4F shows a rear plan view of the cover of FIG. 4A.
Figure 4G:
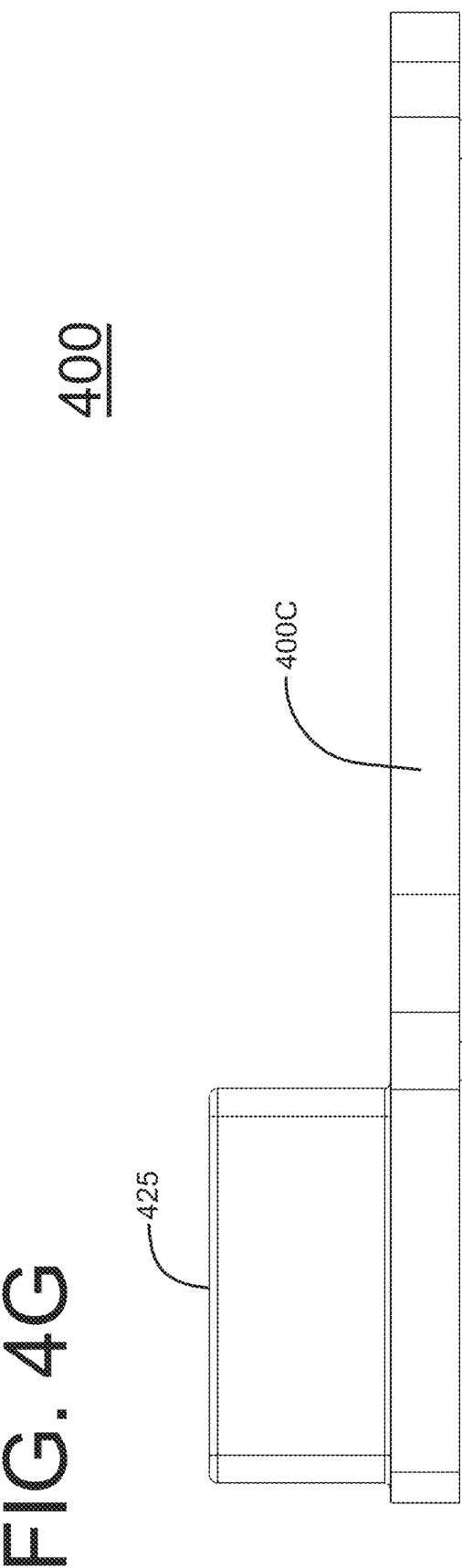
FIG. 4G shows a left side plan view of the cover of FIG. 4A.
Figure 4H:
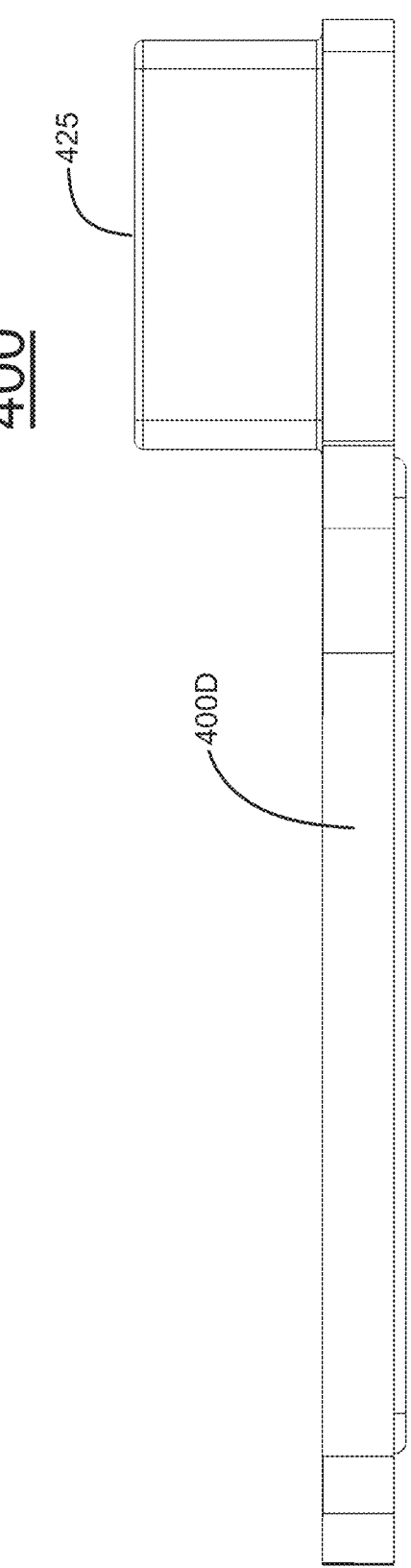
FIG. 4H shows a right side plan view of the cover of FIG. 4A.

FIG. 4D shows a bottom plan view of cover 400 that provides more detail with respect to slot 445A and the channel 445B below slot 445A. As more clearly seen in the front plan view of FIG. 4E, channel 445B acts as a slot extension of slot 445A that fans out to become wider from top to bottom. Slot 445A is relatively narrow but sufficiently wide to receive the narrow keel vertical member 104. Channel 445B is sufficiently wide and angled to receive the upper angled portion of keel bottom member 155 of FIG. 1L. FIG. 4F is rear plan view of cover 400. FIG. 4G depicts side plan view of cover 400 showing left side 400C and RF transceiver housing 425. FIG. 4H depicts a side plan view of cover 400 showing right side 400D and RF transceiver housing 425.

Figure 4I:
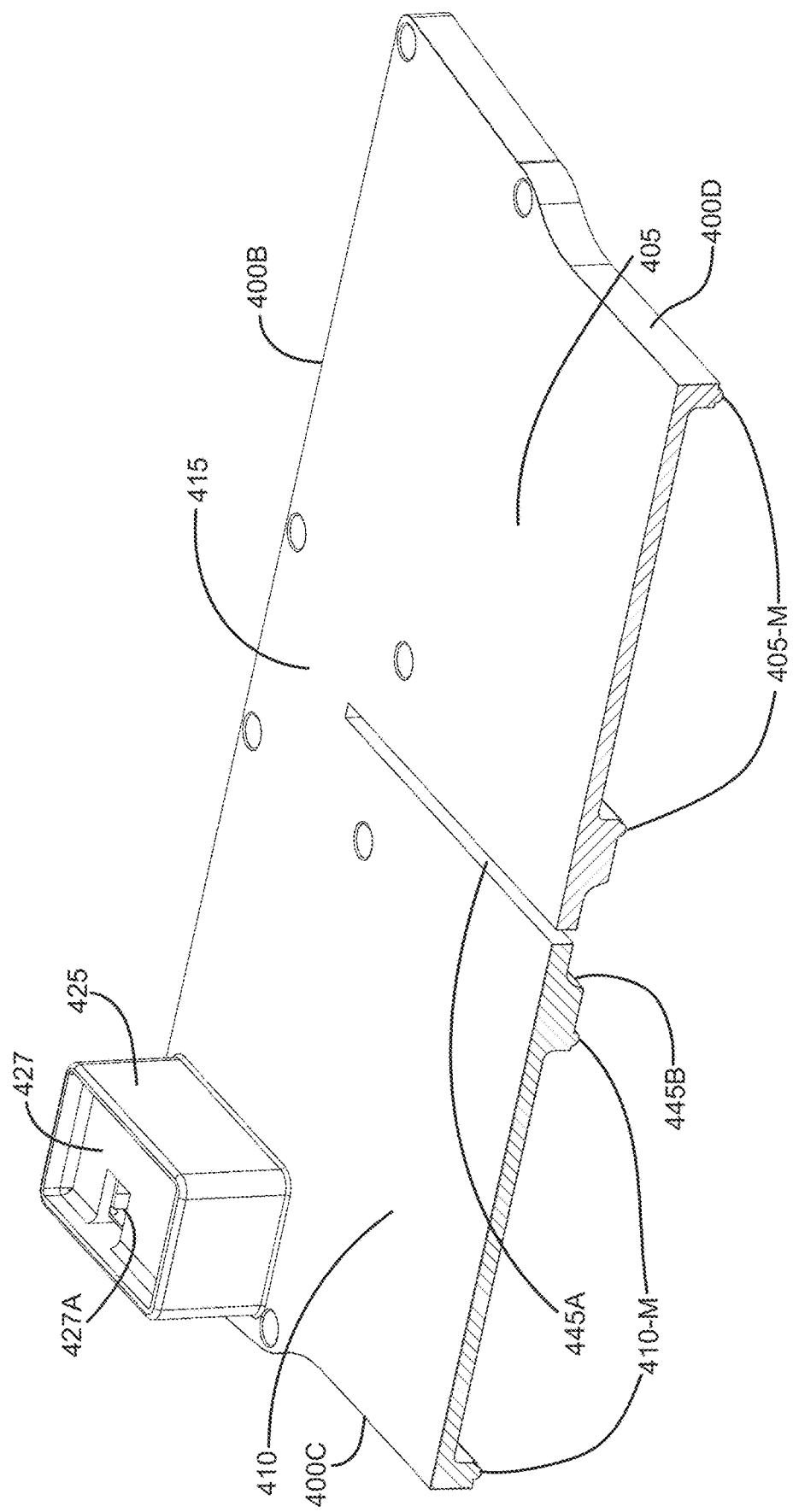
FIG. 4I is a cross-sectional view of the cover of FIG. 4A taken along section line 4I-4I of FIG. 4A.

FIG. 4I is a cross-sectional view of cover 400 taken along section line 4I-4I of FIG. 4A. In the above discussion of FIG. 4B, the male sealing member 410-M is discussed. As noted, male sealing member 410-M of cover 400 of FIG. 4B mates with a corresponding female sealing member 315-F of FIG. 3H to close the chamber 315 below male sealing member 410-M to make chamber 315 watertight. Mounting cover 400 at the top of drive assembly 300 also closes antechamber 320 although antechamber may not be watertight. In one embodiment, male sealing member 405-M of cover 400 of FIG. 4B mates with a corresponding female sealing member 335-F of FIG. 3H to close the chamber 335 below male sealing member 405-M to make chamber 335 watertight. Mounting cover 400 at the top of drive assembly 300 also closes antechamber 340 although antechamber may not be watertight. In practice, chamber 340 may store ballast such as sand wherein the amount of sand used is selected to balance the assembly formed by RPA 200 mounted on a decoy. Alternatively, chamber 340 may store additional electronic circuitry and/or additional batteries. In these embodiments, shared chamber wall 335A may include an opening (not shown) similar to opening 316 that receives a grommet (not shown) similar to grommet 600, so that insulated electrical wires may pass from chamber 335 to antechamber 340 while preserving the watertight sealing of chamber 335.

In one embodiment, chamber 315 houses electronic control circuitry powered by a rechargeable battery situated in chamber 315. Structures within chamber 315 are now described starting at the bottom of chamber 315. In this particular embodiment, the lowermost structure within chamber 315 is a wireless power receiver 505 that includes a positive output terminal 505A and a negative output terminal 505B. Power receiver 505 also includes an alternating current (AC) power receiving coil 506 that is represented by a spiral in FIG. 5A. To induce a voltage at terminals 505A and 505B, the power receiver 505 in drive assembly 300 is positioned near an alternating current (AC) electromagnetic field generated by a power transmitter 755 (FIG. 7), i.e. an external charging station, that is positioned near power receiver 505, i.e. typically within approximately 2 mm to approximately 10 mm of power receiver 505 although greater or smaller distances may be possible. Wireless charger 505 includes a rectifier 507 that converts the AC voltage that power transmitter 755 induces in power receiving coil 506 to a DC voltage that is provided between positive output 505A and negative output 505B.

FIG. 5B shows a controller board that 510 is situated above power receiver 505 of FIG. 5A to provide control and communications for RPA 200, as discussed in more detail with reference to FIG. 7A. Controller board 510 is situated above power receiver 505 which is rendered in dashed lines in FIG. 5B to indicate that power receiver 505 is below controller board 510. In one embodiment, wireless charger 505 may be situated on the bottom surface of controller board 510 while battery 515 is situated atop controller board 510. In this embodiment, voltage supply terminals 510A and 510B on the top of controller board 510 connect through controller board 510 to respective terminals 505A and 505B below, respectively. In this manner, battery 515 receives power from power receiver 505.

Figure 5C:
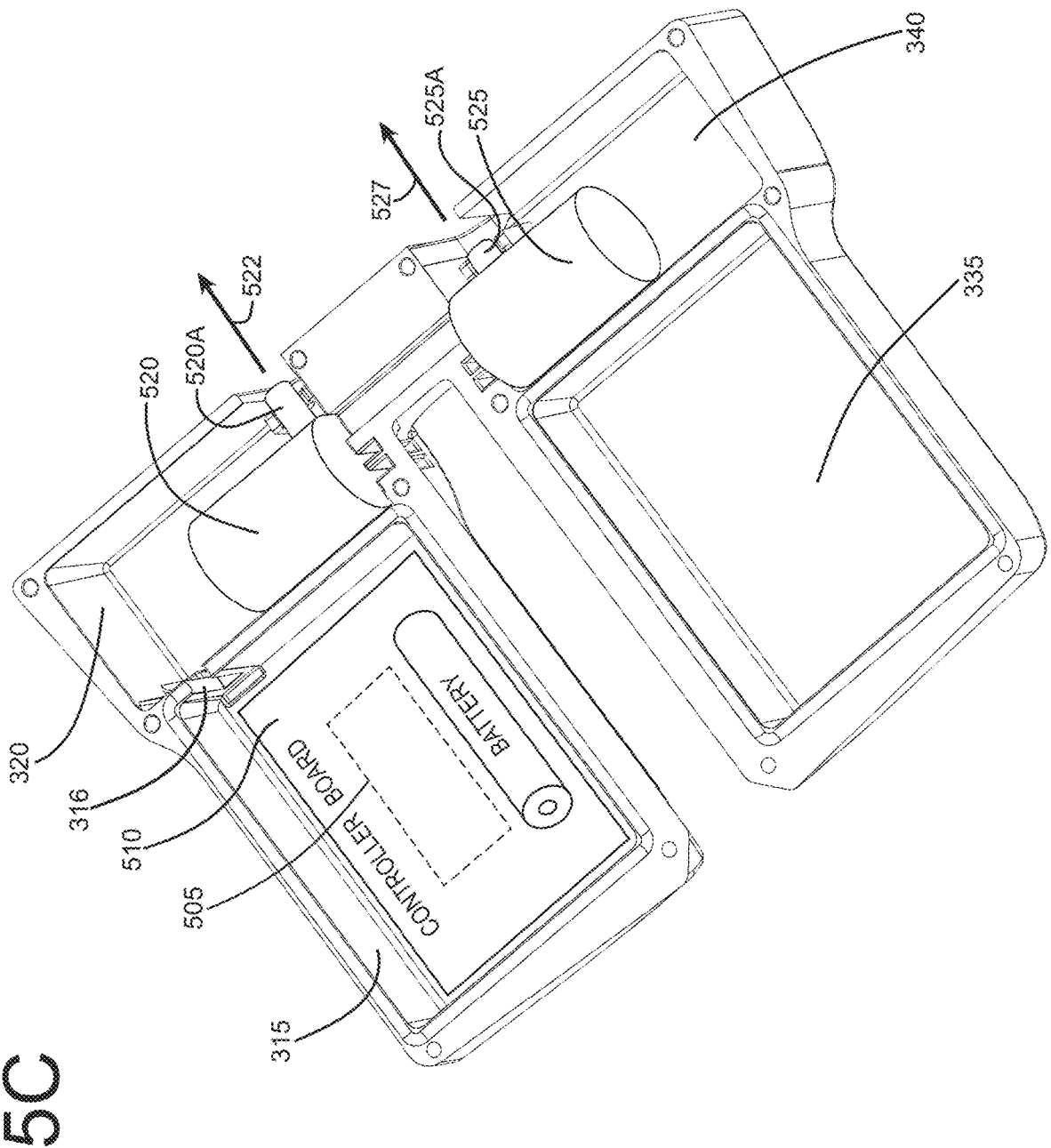
FIG. 5C shows the view of FIG. 5B with water propulsion devices installed.

FIG. 5C shows drive assembly 300 of FIG. 5B with antechambers 320 and 340 now respectively populated with water propulsion devices 520 and 525 which are similar to, or the same as, water propulsion devices 520 and 525 described above. Water propulsion devices 520 and 525 are inboard with respect to RPA 300. Controller board 510 connects to water propulsion devices 520 and 525 to control the amount of water output, i.e. thrust, provided by each of water propulsion devices 520 and 525 at any point in time. To push decoy 100 straight, controller board 510 commands water propulsion devices 520 and 525 to generate the same amount of thrust. To push decoy 100 at higher speed, controller board 510 instructs water propulsion devices 520 and 525 to generate more but still equal amounts of thrust. To push decoy 100 at slower speed, controller board 510 instructs water propulsion devices 520 and 525 to generate less but still equal amounts of thrust. To turn decoy 100 right, controller board 510 instructs water propulsion device 525 to generate more thrust than water propulsion device 520. To turn decoy 100 left, controller board 510 instructs water propulsion device 520 to generate more thrust than water propulsion device 525. In this manner, controller board 510 controls the steering and speed of the decoy 100 mounted to RPA 200. Arrows 522 and 527 represent the direction of the waterjets emanating from water propulsion devices 520 and 525.

Figure 6L:
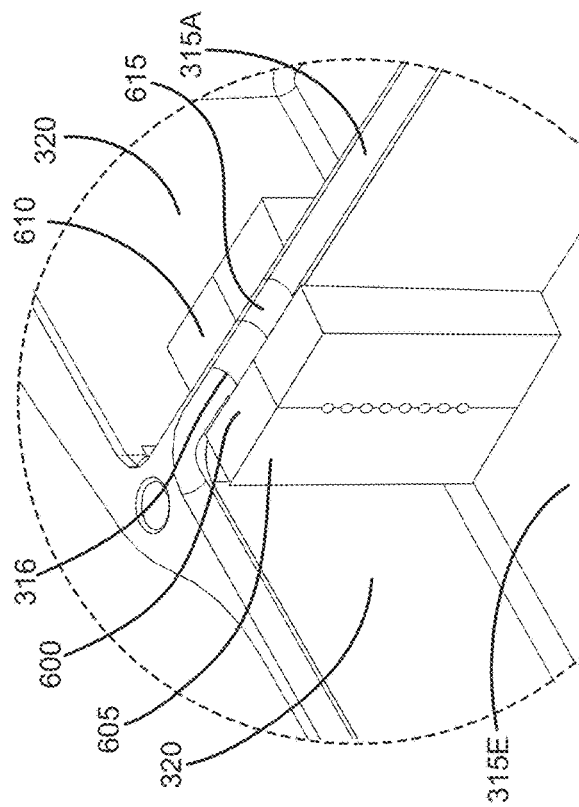
FIG. 6L is a perspective view showing the grommet after installation in the opening of FIG. 6J.

The connection of controller board 510 to water propulsion devices 520 and 525 is discussed in more detail with reference to FIG. 6N and FIG. 6O below. The user employs a remote wireless controller 720 to provide instructions to controller board 510 with respect to the steering and speed of the decoy mounted to RPA 200, as discussed below with reference to FIGS. 6P, 6Q and 7. In one embodiment, the remote wireless controller 720 may be a communication device such as a smart phone (FIG. 7).

Referring now to FIG. 6A along with and FIG. 3H and FIG. 5C, FIG. 6A is a perspective view showing a grommet 600 that enables electrical wires to pass from controller board 510 in chamber 315 (FIG. 5C), through opening 316 (FIG. 3H and FIG. 5C), to antechamber 320 such that chamber 315 is watertight. In FIG. 6A, grommet face 605A faces forward. Grommet 600 of FIG. 6A includes generally rectangular seal members 605 and 610 that are joined together by connective member 615 therebetween, as shown. Grommet 600 may be fabricated of silicone, polyvinylchloride (PVC), polyurethane or other compounds with similar water-sealing properties. In this particular embodiment, grommet 600 includes eight conduits 611, 612, ... 618 that pass through grommet 600 from grommet face 605A to grommet face 610A (visible in FIG. 6B). Each of conduits 611, 612, ... 618 accommodates and routes a respective insulated electrical wire from chamber 315 to antechamber 320 in a watertight manner. Seal member 605 includes a main body 620 with a top 620A and a bottom 620B. Seal member 605 also includes a seal member extension 622 extending from main body 620 at bottom 620B which is indicated by a dashed line in FIG. 6A. In other words, the portion of seal member 605 below the bottom 620B is seal member extension 622 which includes bottom 622A.

Seal member 610 includes a main body 630 with a top 630A and a bottom 630B. Seal member 610 also includes a seal member extension 632 extending from main body 630 at bottom 630B which is indicated by a dashed line in FIG. 6A. In other words, the portion of seal member 610 below the bottom 630B is seal member extension 632 which includes bottom 632A.

FIG. 6B is a perspective view showing grommet 600 with grommet face 610A facing forward. FIG. 6C is a cross section of grommet 600 taken along section line 6C-6C of FIG. 6A. Conduits 611, 612, ... 618 are seen extending from the forward face 605A of grommet 600 to the rearward face 610A to enable insulated electrical wires to extend through respective conduits. FIG. 6D is a right side plan view of grommet 600, while FIG. 6E presents a left side plan view of grommet 600. FIGS. 6F and 6G respectively show plan views of grommet front face 605A and grommet rear face 610A on the opposed front and back sides of grommet 600. FIGS. 6H and 6I respectively show top and bottom plan views of grommet 600.

Figure 6K:
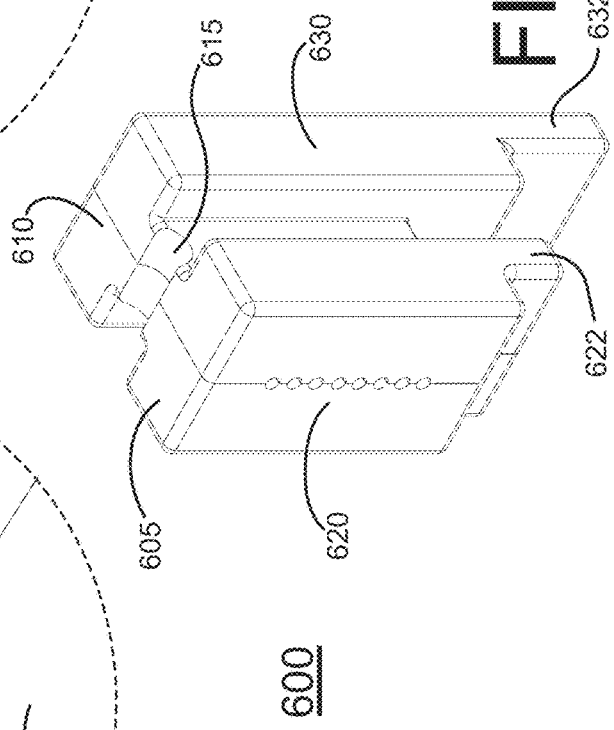
FIG. 6K is a front perspective view of a grommet before installation in the opening of FIG. 6J.
Figure 6J:
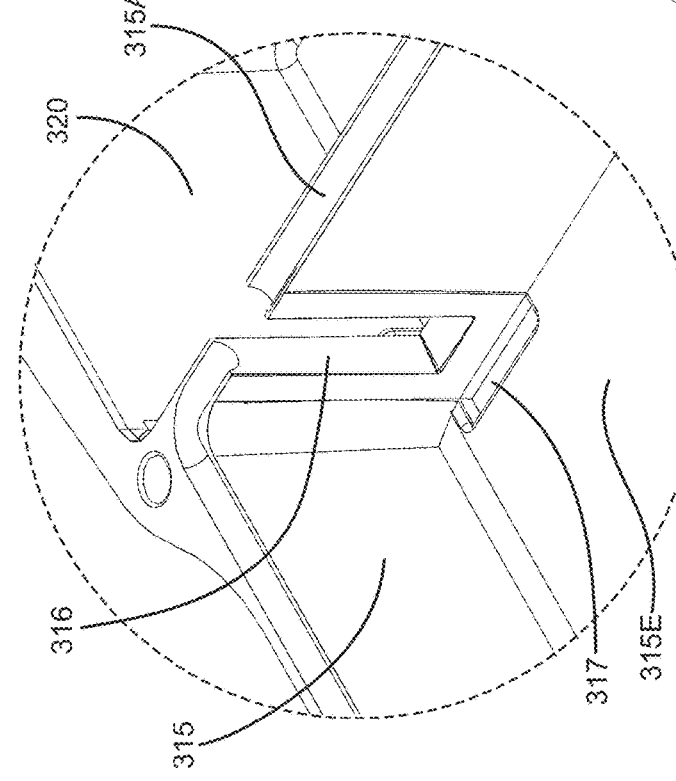
FIG. 6J is an enlarged perspective view showing the opening between a chamber and antechamber of the RPA as viewed from the chamber side of the opening.
Figure 6M:
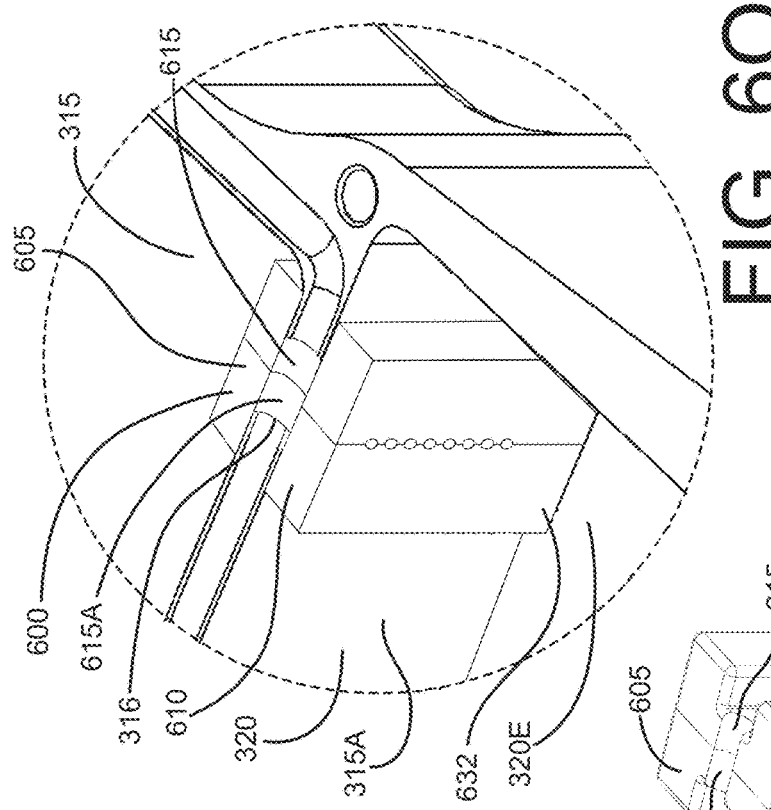
FIG. 6M is a perspective view of the opening between the chamber and antechamber as viewed from the antechamber side of the opening.

FIG. 6J is an enlarged view of the portion of FIG. 3A-1 identified by the dashed-line circle with the legend 6J in FIG. 3A-1. FIG. 6K shows a perspective view of grommet 600 before grommet 600 is installed in opening 316 as seen in FIG. 6L. FIG. 6M is an enlarged view of the portion of FIG. 3A-2 identified by the dashed-line circle with the legend 6M. Returning now to FIGS. 6J-6L, to provide a watertight seal between chamber 315 and antechamber 320, the manufacturer or other entity installs grommet 600 of FIG. 6K in opening 316 of the shared wall 315A between chamber 310 and antechamber 320, as seen in FIGS. 6J and 6L. More particularly, grommet 600 slides into opening 316 from above such that connective member 615 fills opening 316 with seal member 605 being situated on the chamber side of shared wall 315A while seal member 610 is situated on the antechamber side of shared wall 315A. In this particular embodiment, opening 316 is a vertical slot in shared wall 315. Seal member extension 622 of seal member 620 sits in floor depression 317 to assist in providing sealing action. Floor indentation 317 may also be referenced as floor depression 317. Floor indentation 317 is sufficiently shallow that it does not pierce through floor 315E of chamber 315. In this manner, the watertight quality of chamber 315 is preserved. FIG. 6L shows grommet 600 after installation in opening 316. Seal member extension 622 of grommet 600 of FIG. 6K is not visible in FIG. 6L because seal member extension 622 in installed in depression 317 of floor 315E.

Figure 6N:
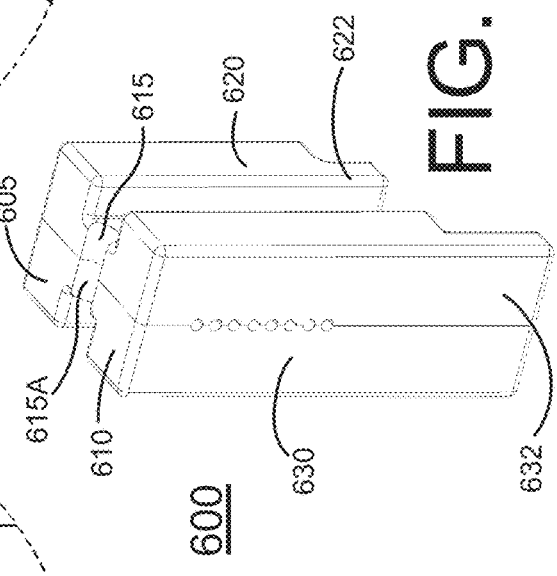
FIG. 6N is a rear perspective view of the grommet before installation in the opening of FIG. 6M.
Figure 6O:
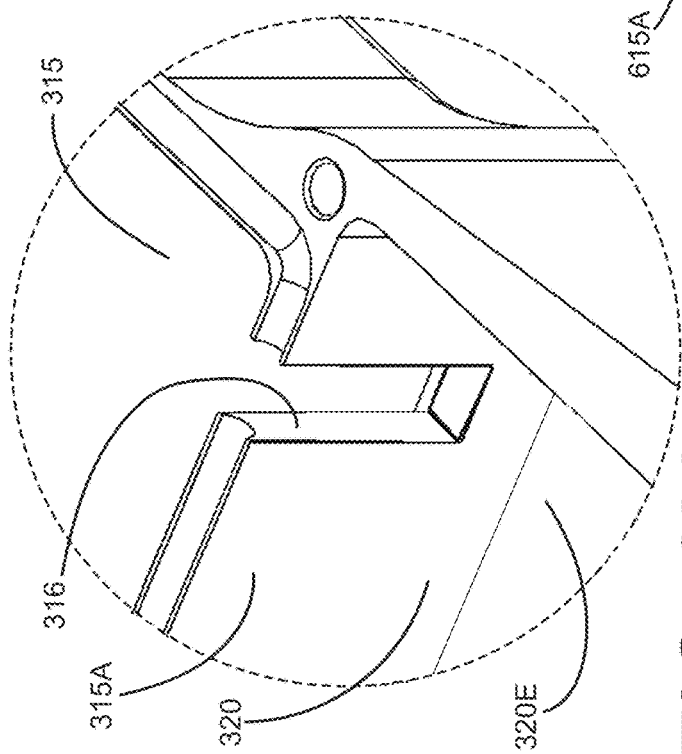
FIG. 6O is a perspective view showing the grommet after installation in the opening of FIG. 6M.
Figure 7:
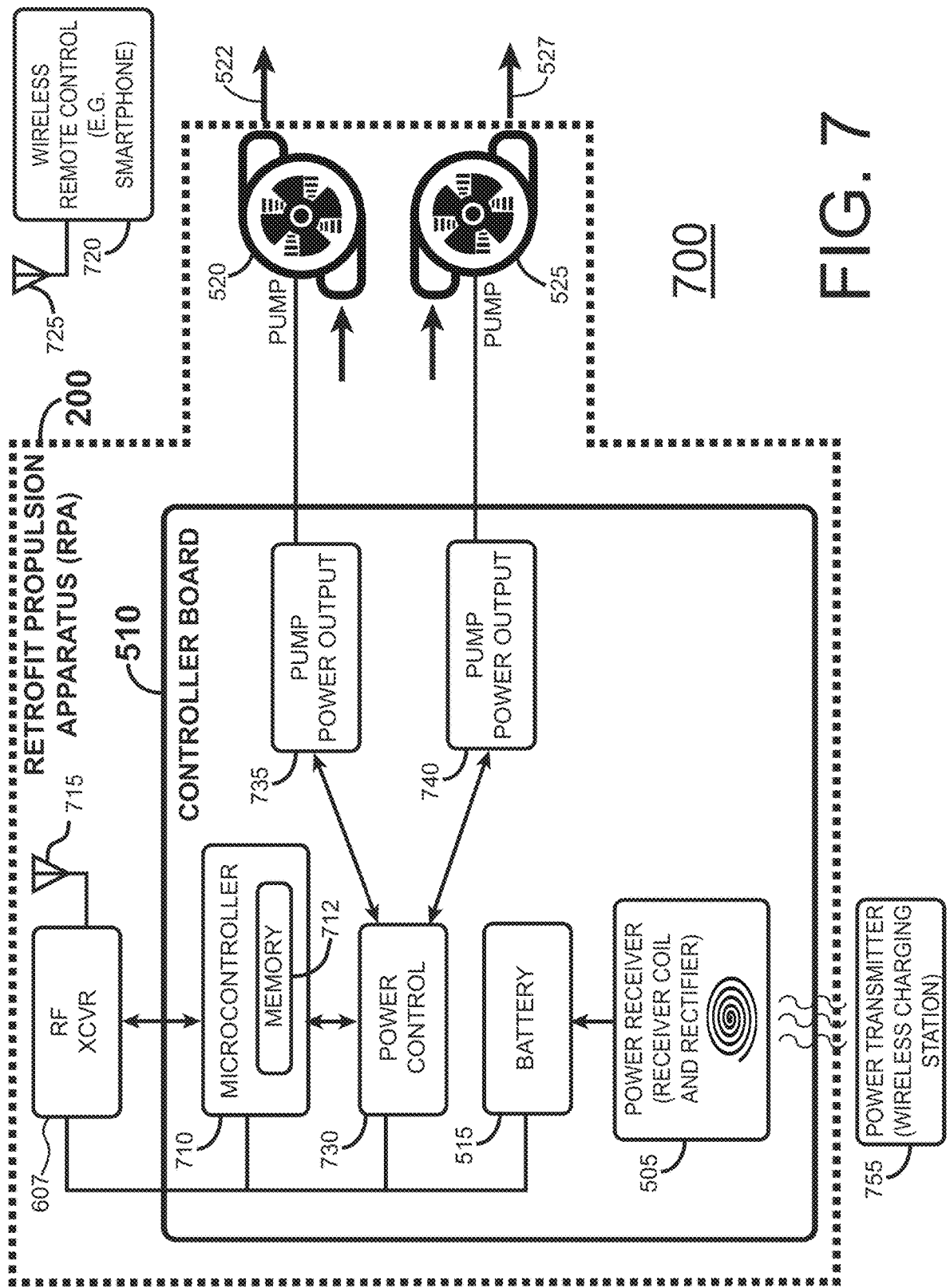
FIG. 7 is a high-level block diagram of a decoy propulsion and control system that includes retrofit propulsion apparatus (RPA), a wireless remote control, and a wireless power transmitter.

FIGS. 6M, 6N and 6O are now referenced with respect to installation of grommet 600 in opening 316 as viewed from the antechamber 320 side of shared wall 315A. As grommet 600 is slid downward into opening 316 from above of FIG. 6M, seal member extension 632 of FIG. 6N comes to rest on floor 320E of antechamber 320 as seen in FIG. 6O. Connective member 615 fills opening 316. FIG. 6O shows that the cross-sectional geometry of the top 615A of connective member 615 matches the cross-sectional geometry of the top of shared wall 315A. For example, if the top of shared wall 315A exhibits a female geometry that is concave, then the geometry of the top 615A of connective member 615 is likewise female and concave. In this manner, the top of shared wall 315A and the top of connective member 615 exhibit the same matching female concave geometry to form a continuous trough. Thus, when cover 400 of FIG. 4B and FIG. 4I is situated atop drive assembly 300 of FIG. 5A during the process of closing and sealing RPA 200, the convex male sealing members 410-M on the bottom of cover 400 will mate with the concave female sealing members of shared wall 315 and walls 315B, 315C and 315D to seal chamber 315.

In the above embodiment of FIGS. 6M, 6N and 6O, while chamber 315 is sealed watertight, antechamber 320 is not sealed watertight. If desired, chamber 335 may be configured to be watertight by using the teachings above to seal chamber 335. More particularly, to seal chamber 335 watertight, cover 400 (discussed above with reference to FIG. 4A-4I) is provided with a female sealing member 335-F (FIG. 3H) that sealably mates with a corresponding male sealing member 405-M when RPA 200 is closed by installing cover 400 on drive assembly 300. Alternatively, member 335-F may be a male sealing member and member 335-M may be a female sealing member that mate with one another to seal chamber 335.

Figure 6P:
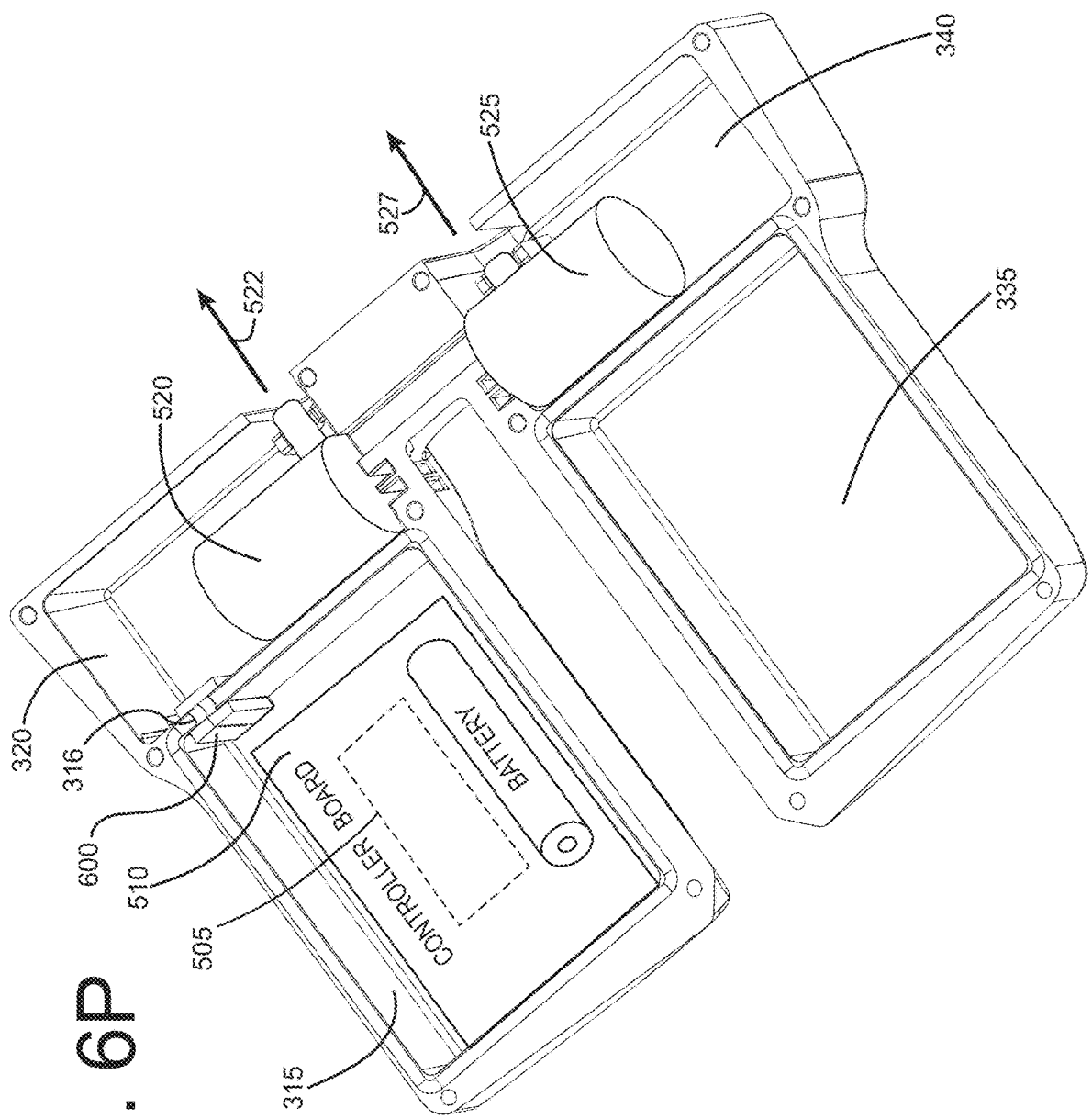
FIG. 6P is a perspective view of the drive assembly after grommet installation.

FIG. 6P shows a continuation of the process of assembling drive assembly 300 subsequent to the installation of water propulsion devices 520 and 525 of FIG. 5C. More particularly, FIG. 6P shows drive assembly 300 after installation of grommet 600 in opening 316 to facilitate the routing of insulated electrical wires between chamber 315 and the antechambers 320 and 340 of drive assembly 300. FIG. 6Q represents these insulated electrical wires from controller board 510 as wires 640-CB that enter grommet 600 in chamber 315. These same wires exit grommet 600 in antechamber 320 as: 1) wires 640-XCVR that couple controller board 510 to the RF transceiver (RF XCVR) 607 in RF transceiver housing 425 on cover 400, 2) wires 640-M1 that couple controller board 510 to water propulsion device 520, and 3) wires 640-M2 that couple controller board 510 to water propulsion device 525. More wires can be installed in grommet 600 depending on the number of conduits required for a particular application. To maintain the watertight quality of grommet 600 all conduits such be populated by snuggly fitting electrical wires or alternatively plugged if not used in a particular application.

FIG. 6R shows RF XCVR 607 situated in tower 425 atop cover 400 of RPA 300. FIG. 6S shows a more detailed representation of RF XCVR 605. To provide a waterproof seal for the electrical circuit of RF XCVR 605 at its mounting location near the top of tower 425, a cover 650 shown in FIG. 6T is configured to snugly fit over tower 425 as seen in FIG. 6R together with FIG. 6U. In this particular embodiment in which tower 425 exhibits a generally parallelepiped geometry, cover 650 likewise exhibits a parallelepiped shape that includes an interior cavity that matches, but is slightly larger than, the exterior of tower 425. In this manner, cover 650 snugly fits over tower 425 and forms a watertight seal. In one embodiment, cover 650 may be fabricated of acrylonitrile butadiene styrene (ABS) plastic, polyvinylchloride (PVC), polyethylene, polypropylene, or thermoplastic polyurethane (TPU), for example. The sides of cover 650 are equipped with fin-like ribs such as projections 655 to facilitate installation on, and removal of, cover 650 from tower 425.

FIG. 7 is a high-level block diagram of a decoy propulsion and control system 700 that includes retrofit propulsion apparatus (RPA) 200, a wireless remote control 720 with an antenna 725, and a wireless power transmitter 755. Wireless remote control 720 may be a mobile transceiver such as a smartphone in one embodiment. Wireless remote control 720 enables a user to transmit control instructions such as desired direction and speed to RPA 200. RPA 200 includes an antenna 715 that couples to an RF transceiver 607 that receives the control instructions from wireless remote control 720. More specifically, RF transceiver 607 receives an RF signal containing the control instructions coded on an RF signal from wireless remote control 720. RF transceiver 607 decodes the coded control instructions and sends the decoded control instructions to microcontroller 710.

In response to the control instructions, microcontroller 710 instructs power controller 730 to generate an appropriate pump power output signal at pump power output 735 and/or pump power output 740 to control the amount of propulsive thrust produced by water propulsion device 520 and/or 525 to cause the decoy 100 (not shown) mounted on RPA 200 to steer to the direction designated by the control instructions and at a speed specified by the control instructions. Microcontroller 710 may send system status information from controller board 510 via RF transceiver 607 back to wireless remote controller 720. Such system status information may include information related to propulsion device 520 performance, propulsion device 525 performance, battery charging state information (e.g. % charge of battery 515) and other status information.

To provide power to RPA 200, battery 515 couples to RF transceiver 607, microcontroller 710, and power controller 730 as shown. In this particular embodiment, RPA 200 employs wireless charging. A power receiver 505 couples to battery 515 as shown in FIG. 7. Power receiver 505 includes a battery charging coil and a rectifier. In more detail, to charge battery 515, RPA is positioned so that power receiver 515 is close to an external power transmitter 755, also know as a charging station. Power transmitter 755 generates an alternating current that induces an alternating current in the nearby battery charging coil of power receiver 505. A rectifier (not shown) in power receiver 505 rectifies the induced alternating current to provide a direct current that charges battery 515. When charging is complete, RPA 200 is removed from power transmitter (charging station) 755. RPA 200 is now fully charged and ready for use.

A control application may be stored in nonvolatile memory 712 of microcontroller 710 to interpret control instructions that microcontroller 710 receives from wireless remote control 720 via transceiver RF XCVR 607. For example if the user of wireless remote control 720 sends a first speed command to RPA 200, then the control application of microcontroller 710 receives the first speed command from RF XCVR 607. In response to the first speed command, microcontroller 710 causes power control 730 to generate the same first power output voltage at pump power outputs 735 and 740. In response to receiving the same first power output voltage, water propulsion devices 520 and 525 exhaust sufficient water for decoy 100 with RPA 200 attached thereto to move in the aquatic environment at the first commanded speed. In this case, both water propulsion devices 520 and 525 exhaust the same amount of water per unit time such that decoy 100 moves straight forward at the instructed first speed.

Alternatively, if the user of wireless remote control 720 sends a second speed command to RPA 200, then microcontroller 710 receives the second speed command from RF XCVR 607. In response to the second speed command, microcontroller 710 causes power control 730 to generate the same second power output voltage at pump power outputs 735 and 740. In response to receiving the second power output voltage, water propulsion devices 520 and 525 exhaust sufficient water for decoy 100 with RPA 200 attached thereto to move in the aquatic environment at the second commanded speed. In a similar manner the user may instruct RPA 200 to move in water at a third speed, fourth speed, and so forth, as desired. In this case, both water propulsion devices 520 and 525 exhaust the same amount of water per unit time such that decoy 100 moves straight forward at the instructed second speed.

Alternatively, if the user of wireless remote control 720 desires RPA 200 and decoy 100 to turn to the right, then remote control 720 sends a turn right control instruction to RPA 200. In response to receiving the turn right command, microcontroller 710 instructs pump power output 740 to provide a higher voltage to pump 525 than pump power output 735 provides to pump 520. In this manner, pump 525 generates more thrust than pump 520 such that RPA 200 with decoy 100 thereon turns to the right.

Alternatively, if the user of wireless remote control 720 desires RPA 200 and decoy 100 to turn to the left, then remote control 720 sends a turn left control instruction to RPA 200. In response to receiving the turn left command, microcontroller 710 instructs pump power output 735 to provide a higher voltage to pump 520 than pump power output 740 provides to pump 525. In this manner, pump 520 generates more thrust than pump 525 such that RPA 200 with decoy 100 thereon turns to the left.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A retrofit propulsion apparatus attachable to an avian decoy to propel the avian decoy in an aquatic environment, the apparatus comprising:
   a first housing including:
      a first watertight chamber;
      a first non-watertight chamber, the first watertight chamber and the first non-watertight chamber sharing a first common wall therebetween; and
      a first housing rear end;
   a second housing including:
      a second watertight chamber;
      a second non-watertight chamber, the second watertight chamber and the second non-watertight chamber sharing a second common wall therebetween; and
      a second housing rear end;
   a cover situated atop the first and second housings to cover the first and second housings, the cover including a slot that exhibits a first width sufficiently wide to slidably receive an upper portion of an avian decoy keel;

a connective member that connects the first housing rear end to the second housing rear end, the connective member holding the first housing spaced-apart from the second housing to form a channel therebetween, the channel exhibiting a second width sufficiently wide to receive a lower portion of the avian decoy keel to mount the retrofit propulsion apparatus to the avian decoy, wherein the second width is larger than the first width, the slot of the cover being aligned with the channel;

a first water propulsion device situated in the first non-watertight chamber of the first housing, and a second water propulsion device situated in the second non-watertight chamber of the second housing.

2. The retrofit propulsion apparatus of claim 1, wherein the first housing includes
- a first plurality of walls including the first common wall;
- a first floor situated at a bottom of the first plurality of walls, and
- a first sealing member situated at a top of the first plurality of walls.

3. The retrofit propulsion apparatus of claim 2, wherein the first housing includes the cover is situated at the tops of the first watertight chamber, the first non-watertight chamber, the second watertight chamber, and the second non watertight chamber to seal these chambers;
the cover including a second sealing member that mates with the first sealing member of the first plurality of walls to seal the first watertight chamber of the first housing.

4. The retrofit propulsion apparatus of claim 3, wherein the first common wall includes an opening between the first watertight chamber and the first non-watertight chamber of the first housing.

5. The retrofit propulsion apparatus of claim 4, wherein a grommet including multiple conduits is situated in the opening in the first common wall, the grommet including an upper sealing portion that exhibits a geometry that matches a cross-sectional geometry of the top of the first common wall, such that both the grommet and the first sealing member at the top of the first common wall mate with the second sealing member of the cover to seal the first watertight chamber.

6. The retrofit propulsion apparatus of claim 5, wherein the connective member includes a wiring channel between the first non-watertight chamber of the first housing and the second non-watertight chamber of the second housing.

7. The retrofit propulsion apparatus of claim 6, wherein the first non-watertight chamber includes a first water intake vent to supply the first water propulsion device with water for propulsion.

8. The retrofit propulsion apparatus of claim 7, wherein the second non-watertight chamber includes a second water intake vent to supply the second water propulsion device with water for propulsion.

9. The retrofit propulsion apparatus of claim 8, wherein the connective member includes an inverted U-shaped opening on a bottom of the connective member, the inverted U-shaped opening being positioned to receive a cap of the lower portion of the avian decoy keel during mounting of the retrofit propulsion apparatus to the avian decoy.

10. The retrofit propulsion apparatus of claim 1, including controller apparatus situated in the first watertight chamber to control power supplied to the first and second water propulsion devices to control the speed of the retrofit propulsion apparatus in water.

11. The retrofit propulsion apparatus of claim 10, wherein the controller apparatus situated in the first watertight chamber controls power supplied to the first and second water propulsion devices to control the direction of the retrofit propulsion apparatus in water.

12. The retrofit propulsion apparatus of claim 11, wherein the cover includes a radio transceiver that couples to the controller apparatus in the first watertight chamber to receive control instructions from a wireless remote control.

13. The retrofit propulsion apparatus of claim 12, wherein the wireless remote control comprises a smartphone.

14. The retrofit propulsion apparatus of claim 11, further comprising:
- a battery situated in the first watertight chamber;
- a power receiver situated in the first watertight chamber, the power receiver being coupled to the battery, and
- the power receiver being configured to receive power from a wireless charging station power transmitter when positioned close thereto.

* * * * *